United States Patent
Miranda Olvera et al.

(10) Patent No.: US 9,790,446 B2
(45) Date of Patent: Oct. 17, 2017

(54) APPLICATION OF A CHEMICAL COMPOSITION FOR VISCOSITY MODIFICATION OF HEAVY AND EXTRA-HEAVY CRUDE OILS

(71) Applicants: INSTITUTO MEXICANO DEL PETROLEO, Mexico City (MX); UNIVERSIDAD DE GUANAJUATO, Mexico City (MX)

(72) Inventors: Alma Delia Miranda Olvera, Mexico City (MX); Jose Manuel Dominguez Esquivel, Mexico City (MX); Ricardo Garcia Chavez, Mexico City (MX); Miguel Angel Vazquez Guevara, Mexico City (MX)

(73) Assignees: INSTITUTO MEXICANO DEL PERTOLEO, Mexico City (MX); UNIVERSIDAD DE GUANAJUATO, Mexico City (MX)

( * ) Notice: Subject to any disclaimer, the term of this patent is extended or adjusted under 35 U.S.C. 154(b) by 275 days.

(21) Appl. No.: 14/520,734

(22) Filed: Oct. 22, 2014

(65) Prior Publication Data
US 2015/0111799 A1    Apr. 23, 2015

(30) Foreign Application Priority Data
Oct. 22, 2013    (MX) .................... MX/a/2013/012324

(51) Int. Cl.
*C09K 8/58*    (2006.01)
*C10M 101/02*    (2006.01)
(Continued)

(52) U.S. Cl.
CPC .......... *C10M 101/02* (2013.01); *C09K 8/035* (2013.01); *C09K 8/584* (2013.01); *C10M 133/46* (2013.01);
(Continued)

(58) Field of Classification Search
CPC .............................. C10M 101/02; C09K 8/584
(Continued)

(56) References Cited

U.S. PATENT DOCUMENTS 3,707,459 A    12/1972    Mason et al.
3,823,776 A    7/1974    Holmes
(Continued)

FOREIGN PATENT DOCUMENTS

EP    0175511    3/1986

*Primary Examiner* — Ellen McAvoy
(74) *Attorney, Agent, or Firm* — Dickinson Wright PLLC

(57) ABSTRACT

The present invention relates to the use of a chemical composition to modify the physical properties (viscosity and interfacial tension) of heavy and extra-heavy crude oils, to increase their mobility. The chemical composition comprises or consists of a combination of systems based on ionic and non-ionic liquids, which may be pure or modified, mixed in an aqueous or organic medium as a dispersing agent, depending on the nature of the crude to be treated, together with a surfactant. The composition is mixed with the crude oil at a temperature between 5 and 100° C., at pressures from 1 atm (14.7 psi) up to about 680.2 atm (10,000 psi). The composition can be mixed with heavy crude oils, at the point of extraction from the well in the field, during the transport of crude oil in pipelines, or in the well discharge pipelines.

18 Claims, 4 Drawing Sheets

(51) Int. Cl.
  *C09K 8/584* (2006.01)
  *C10M 133/46* (2006.01)
  *C09K 8/035* (2006.01)
  *C09K 8/524* (2006.01)

(52) U.S. Cl.
  CPC ..... *C09K 8/524* (2013.01); *C10M 2203/1006* (2013.01); *C10M 2211/00* (2013.01); *C10M 2215/224* (2013.01); *C10N 2220/04* (2013.01); *C10N 2230/02* (2013.01); *C10N 2230/04* (2013.01)

(58) Field of Classification Search
  USPC .................................................. 508/269, 283
  See application file for complete search history.

(56) References Cited

U.S. PATENT DOCUMENTS

| | | | |
|---|---|---|---|
| 4,298,455 A | 11/1981 | Huang | |
| 5,077,414 A | 12/1991 | Arduengo, III | |
| 5,447,199 A | 9/1995 | Dawson et al. | |
| 5,529,930 A | 6/1996 | Monticello et al. | |
| 6,129,148 A | 10/2000 | Meeks | |
| 6,279,653 B1 | 8/2001 | Wegener et al. | |
| 6,489,282 B1 | 12/2002 | Di Capua et al. | |
| 6,491,053 B1 | 12/2002 | Briggeman et al. | |
| 6,544,411 B2 | 4/2003 | Varadaraj | |
| 6,924,254 B2 | 8/2005 | Todd | |
| 7,678,745 B2 | 3/2010 | Parris et al. | |
| 8,703,670 B2* | 4/2014 | Alemany | C09K 5/00 508/269 |
| 8,821,716 B2* | 9/2014 | Victorovna Likhanova | C07D 233/58 208/208 R |
| 9,012,381 B2* | 4/2015 | Hayama | C10M 171/00 508/244 |
| 9,404,052 B2* | 8/2016 | Flores Oropeza | C10G 21/08 |
| 9,464,239 B2* | 10/2016 | Nares Ochoa | B01J 27/053 |
| 2004/0232051 A1 | 11/2004 | Varadaraj | |
| 2006/0226072 A1* | 10/2006 | Wyse | B01D 11/0288 210/634 |
| 2008/0257414 A1 | 10/2008 | Tao et al. | |
| 2009/0320771 A1* | 12/2009 | Torres, Jr. | C23C 16/448 122/1 R |
| 2010/0006285 A1 | 1/2010 | Da Silva et al. | |
| 2010/0116713 A1* | 5/2010 | Ortega Garcia | B01J 23/85 208/121 |
| 2010/0140175 A1* | 6/2010 | Wyse | B01D 15/00 210/660 |
| 2012/0157360 A1* | 6/2012 | Massonne | C09K 5/047 508/283 |
| 2012/0261312 A1* | 10/2012 | Flores Oropeza | C01G 31/08 208/188 |
| 2013/0059975 A1* | 3/2013 | Lewandowski | C07D 233/58 525/55 |
| 2013/0099156 A1* | 4/2013 | Stock | C10M 105/70 252/78.1 |
| 2013/0205654 A1* | 8/2013 | Peretolchin | C10L 1/232 44/345 |
| 2014/0238900 A1* | 8/2014 | Flores Oropeza | C10G 31/08 208/188 |
| 2014/0238901 A1* | 8/2014 | Flores Oropeza | C01G 33/04 208/188 |
| 2014/0364661 A1* | 12/2014 | Huo | C09K 8/588 585/4 |
| 2015/0045266 A1* | 2/2015 | Patil | C07C 211/63 508/283 |
| 2016/0024414 A1* | 1/2016 | Patil | C10M 171/00 508/286 |

* cited by examiner

APPLICATION OF A CHEMICAL COMPOSITION FOR VISCOSITY MODIFICATION OF HEAVY AND EXTRA-HEAVY CRUDE OILS

CROSS-REFERENCE TO RELATED APPLICATION

This application claims the benefit and priority under 35 U.S.C. §119 to Mexican Patent Application No. MX/a/2013/012324 with a filing date of Oct. 22, 2013, the disclosure of which is incorporated herein by reference in its entirety.

FIELD OF THE INVENTION

The present invention is related to the application and use of chemical compositions for modifying the physical properties of heavy and extra-heavy petroleum crude oils. The use of such compositions increase mobility by decrease of viscosity and interfacial tension of the heavy and extra heavy oils. The chemical agents and composition comprise or consist of a combination of pure or modified organic ionic species, which are mixed with a dispersing agent that may have either aqueous or organic character, depending on the nature of the crude oils being treated. A surfactant agent can be incorporated into the chemical compositions. The application of the chemical compositions does not require special conditions, and can be used at temperatures between 5 and 90° C., with pressures in the range between 1 atm (14.7 psi) and 680 atm, or about 10,000 psi. Moreover, the dispersing agent may be either aqueous or organic and its action is carried out for certain crude oils under specific basic or acidic conditions. Another feature of this invention is the diversity of application and use along the production line, from the well bottom neighborhood to the surface pipelines. Thus, a substantial reduction of the original fluid viscosity is obtained by injection, mixing and pumping of the above-mentioned chemical composition, which in turn improves the overall production, as well as the transportation and processing of the heavy and extra-heavy crude oils.

BACKGROUND OF THE INVENTION

It is a common practice in the oil industry the use of organic volatile solvents to improve the mobility of heavy crude, for example, light oils, condensates, kerosene, gasoils or mixtures of aromatic products. However, these solvents are not always available and, in most of cases, their use is expensive, because they are usually transported from remote locations and their use as diluents of the heavy oils reduces their economic value.

The differential trend towards the progressive reduction of actual oil reserves in some places has motivated a growing interest in the oils of lesser quality, such as heavy bitumen, oils with API densities between 8 and 22° API, oil shale and tar sands. Also, there is an increased interest in secondary and tertiary enhanced recovery methods, as well as the development of alternative energy sources.

Several research projects on enhanced oil recovery are being carried out and some of them have focused on the recovery of lesser value oils; also, other projects focused on alternative and renewable energy resources. Although the oil industry is mature, still the primary extraction methods use conventional technologies that allow a limited recovery of 15 to about 30% of the extractable reserve. Additionally, the heavy and extra-heavy crude oils present technical difficulties for handling and transportation, due to the high viscosity and low mobility. Thus, there is a need to better understand the correlation between the molecular structure of heavy crude oils and their rheological properties. Only recently the true nature of asphaltenes has been understood, which is determined by the fusion of polyaromatic hydrocarbon (PAH's) of high molecular weight. The asphaltenes are the hardest part of the heavy oils and are a class of compounds whose solubility is low or null in n-heptane, but very high in toluene. The asphaltenes are made up of molecules with 3 to 10 fused aromatic rings, which have lateral alkyl chains with about 3 to 18 carbon atoms; polar, acidic and basic groups at the edges may contain heteroatoms, like sulfur, nitrogen, oxygen and metals (Ni, V). The propensity of asphaltenes to form aggregates through $\pi$-$\pi$ bonds and Van der Waals weak forces, i.e. dipole-dipole and short-range type London dispersion forces, etc. make them too difficult to handle under certain conditions, and their structural polydispersity make them complex to modeling and prediction.

API densities of typical heavy and extra-heavy crude oils are in the interval between 22-12° API for the former and 12 to 5° API for the latter.

Several studies have determined the composition of the heavy oils by separation techniques that combines analysis of major fractions of petroleum, such as simulated distillation and SARA (TLC-FID) fractionation, gas chromatography etc. Other chromatographic tests include ion exchange chromatography, exclusion size chromatography, etc., which have been applied together with the spectroscopic characterization (NMR, MS-MS, MS-FI, EPR). Recently, the use of cyclotron resonance mass spectroscopy was reported.

Among the oil recovery methods that apply in the oil industry, some use chemical injection to reduce the viscosity of heavy oils, for example, U.S. Patent Publication No. 2010/0006285 A1 discloses the use of solvents that are based mainly on petroleum fractions such as diesel and solvents (e.g. biodiesel) that are injected into the geological formation for improving fluency, e.g., Darcy's law establish the relationship $v=-k_o \Delta P/\mu$, where v is the velocity of the fluid, $k_o$ is the permeability of the porous medium; $\Delta P$ is the pressure drop and $\mu$ is the viscosity. This expression is used to calculate the speed of the fluid, or production volume, in terms of viscosity. Also, U.S. Patent Publication No. 2004/0232051 A1 discloses a method based on ultrasound, which is applied in conjunction with an acid treatment of the crude oil, using waste oil, which reduce the viscosity approximately by a factor of 4, using a dispersed phase of acids in a continuous phase of hydrocarbons. These acids are selected from the group of mineral acids and their mixtures. Also, U.S. Pat. No. 6,279,653 discloses a method and apparatus for enhancing oil recovery, which includes the application of alkaline flows and the use of special ultra-sound devices installed inside the well, thus forming an emulsion of oil and water, which is pumped to the surface more efficiently. Also, U.S. Pat. No. 3,823,776 discloses a process for enhancing the recovery of heavy oil, through the establishment of a zone of combustion in the formation, by means of the injection of a gas containing oxygen, in order to oxidize some underground oil, which promotes the formation of a combustion zone "in situ". Subsequently, a caustic aqueous solution is injected to control the combustion, thus facilitating the production of oil. U.S. Pat. No. 7,678,745 B2 discloses the use of organic peroxides, in conjunction with an amine, which promote the reduction of oil viscosity, where the amine acts as a delaying agent. In addition, U.S. Pat. No. 5,529,930 discloses a process to reduce the viscosity of the heavy oil by means of a reaction that turns heterocyclic molecules in the oil into other molecules, whose physico-chemical properties promote a lower viscosity. Also, U.S. Patent Publication No. 2008/0257414 A1 discloses the use of an electric field during sufficient time period, to reduce the viscosity of fluids by a factor of 20%, as compared to the original fluid. U.S. Pat. No. 6,129,148 discloses a method to reduce the viscosity of oil "in situ", by using a heat exchanger, thus reducing its viscosity to facilitate the flow into the well. Also, U.S. Pat. No. 6,544,411 B2 discloses a method to reduce the viscosity of the crude oil and its waste, approximately by a factor of 4, by ultrasonic treatment, in conjunction with the action of an organic acid or a mineral, or their combination. Also, a variety of chemical systems have been reported for reducing the viscosity of the heavy crude oils; for example, the use of primers based on free radicals (U.S. Pat. No. 4,298,455). Also, the use of polymers based on aqueous gels (U.S. Pat. No. 5,447,199) is disclosed to reduce viscosity. Additionally, some methods (U.S. Pat. No. 6,924,254) disclose treating the viscous liquids with peroxides, i.e., pentanedione and other organic peroxides (U.S. Pat. No. 6,489,282). Also, thiols and other aromatic compounds were used (EP 175511), as well as molecular recipients of free radicals (U.S. Pat. No. 3,707,459). Also, U.S. Pat. No. 6,491,053 discloses a process to reduce the viscosity of the heavy oils by mixing a liquid solvent such as kerosene, gasoline, or other aromatics and additives of low viscosity and density, for improving the pumping conditions of the heavy oils. However, some of these chemical compounds can cause a negative environmental impact, causing contamination of the wells, especially when these are high vapor pressure solvents.

In general, there are some factors that impede the recovery of the heavy oils, such as the low rock permeability, the wettability factor, the high viscosity of the heavy oils and the fluid channeling during the stimulation process, i.e., water or steam. In addition, the asphaltene precipitation under certain thermodynamic conditions may cause the obstruction of pipelines and devices in the oil facilities, thus affecting the exploitation and the operation sustainability, and causing damage to the infrastructure of the field, as well as potential production losses. In addition, due to the high sulfur content of the heavy crudes, a severe corrosion may take place in the pipelines, valves, and storage tanks. In contrast, reducing the viscosity of the heavy oil can bring technical benefits such as easing the handling along the production line, from extraction stage, transport and processing stages. Also, the final disposal of wastes should be easier and less costly, thus ensuring production, the installation maintenance and the operation sustainability.

SUMMARY OF THE INVENTION

All the previous documents identified herein are surpassed by the present invention, which relates to the application of a chemical composition by means of the injection of such composition contained in a dispersed aqueous or organic phase, under certain conditions of temperature, pressure, pH and concentration. This composition reduces the viscosity of heavy crude oils by a factor between 50 and 99.6 percent, with respect to the original fluid. Its application may be performed at several points along the production chain, for example during the stages of extraction, surface transporting by pipelines and during the processing stage. Overall, this composition promotes the mobility of the heavy and extra-heavy crudes, whose densities might vary between 12 and 22° API for the first production and from 5 to 12° API for the second production. Thus, the application of the said chemical composition increases the well productivity, by improving the fluid viscosity along the production well. The process and composition may be applied from the reservoir, at the well level and in the pipelines for surface transport.

Therefore, an object of the present invention is to provide a process for reducing the viscosity of heavy crude oils, by several mechanisms, for example, by forming water-oil emulsions under proper conditions. The invention also provides a process of lowering the heavy oil viscosity by reducing the asphaltenes aggregation state. Another possible mechanism is by providing a lubricant layer between the oil components. Thus, the chemical composition of the invention modifies the aggregation state of asphaltene-asphaltene, asphaltene-resin and asphaltene-organic acids (i.e., naphthenic acids) association. Three factors are recognizable in this mechanism: (a) the weakening of the π-π links between asphaltene molecules, (b) the extraction of polar species from asphaltenic aggregates, and (c) a group chains solubilizing trend. The net effect caused by the use of the chemical composition is to reduce the viscosity of the heavy oils, as well as the reduction of interfacial tension, thus resulting in an increase of mobility and, consequently, the improvement of the pumping conditions. These effects translate into technical operation benefits as well as economic benefits that derive from a better flow control, easing the pumping operation along the production lines, from the extraction, through transportation lines and processing. The net effect, apart the improvement of the overall operation costs, are the flow assurance, a reduction of delivery time, some operations with heavy oil transportation will benefit more than others. For example, the application of the present composition will avoid costs in the use of artificial heating systems along the transportation pipelines. Also, the frequency of production stoppages and frequent repairs will be lesser. Also, a reduced damage caused by asphaltenes precipitation is foretold.

The invention is directed to the use of a chemical composition for substantial viscosity reduction of heavy and extra-heavy crude oils, where the active compound of such composition has the general formula $[C_nH_{2n-m}ClN_2O_2]_x[H_2O]_y$, where $5 \leq n \leq 10$; $1 \leq m \leq 6$. The coefficients x, y are calculated according to the volume of crude oil (z) to be treated, in the range from x+y=0.25z to x+y=0.66z, according to the volume of crude oil to be treated. The ratio x/y can vary preferably in the range between $2 \times 10^{-4}$ and $1 \times 10^{-3}$. A dispersing agent of the composition can be aqueous- or organic-based, with a ratio from 0 to 35% vol based on the whole composition and 60 to 97% of the dispersing agent with respect to the total amount of the active compound. The chemical composition contains a surfactant that allows the formation of an homogeneous emulsion. The surfactant is a compound of alkyl sulfonate-alkylamine, which is formed by an alkyl chain of 8 to about 14 carbons, preferably between 10 and 12 carbons, and a cation formed by isopropyl type chain.

In one embodiment, the active compound has the formula $C_nH_{2-m}ClN_g$ and is an ionic liquid where the cation is an imidazolium cation and the anion is an chloride ion. The nitrogen atoms of the imidazolium cation can be independently substituted with a linear or branched alkyl. In the above formula, n is an integer of 5-10, m is 1-6, and g is 2.

In another embodiment, the active compound has the formula $C_nH_mN_2O_2$ and is an ionic liquid where the cation is an imidazolium cation with a hydroxyalkyl group bonded to the nitrogen atoms, and the anion is $^-OH$. The nitrogen atoms of the imidazolium cation can be independently substituted with a linear or branched alkyl. In one embodiment, the ionic liquid is an imidazolium cation having the formula $[C_nH_{2n-1}N_2]^+$ and a hydroxyl cation $^-OH$. In the formula, n is 5-10 and m is 1-6.

The active compounds of the invention can be ionic liquids of imidazolium cations having the formula

where $A^-$ is $Cl^-$ or $^-OH$, and x is an integer. In the formula, x can be independently 1-10. In other embodiments, x is independently 1-8. Typically, x is 1 or 2 defining a hydroxymethyl or hydroxyethyl substituted imidazolium cation. One example of a suitable ionic liquid is where x is 2 and has the formula

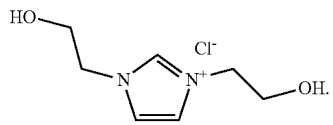 [SMILES: OCCn1cc[n+](CCO)c1 ; [Cl-]]

The ionic liquid can be reacted with an alkylene oxide to form alkylene oxide groups on each of the nitrogen atoms. In one embodiment, the alkylene oxide modified ionic liquid has the formula

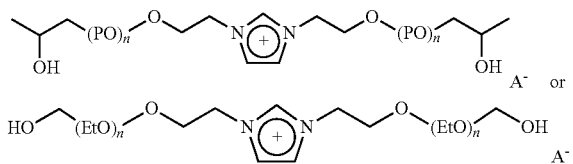

where PO is propylene oxide, EtO is ethylene oxide and n is the number of ethylene oxide or propylene oxide units and is 2-20. One example of a propylene oxide modified ionic liquid has the formula

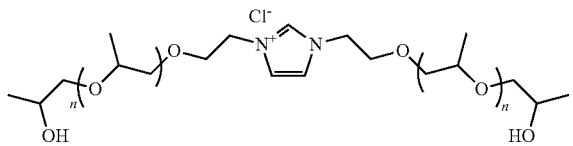

where n is 2-20.

In one embodiment, the dispersing agent is an organic compound, which consists preferably of at least two aromatic compounds from the family of xylenes and methylbenzene. The dispersant agent must be integrated in variable proportions, which depends on the type of crude oil to be treated. More specifically, the proportion of the dispersing agent can vary between 0.3 to 0.5 by volume xylene, 0.1 to 0.5 by volume benzene. Alternatively, a fraction of 0.3 to 0.5 perchloroethylene, with respect to the total volume of such dispersant agent of organic nature. In addition, the composition contains a surfactant in equivalent fraction between 0.01 to 0.025 by volume of the composition.

In another embodiment, the composition is based on a modified ionic liquid, which is also diluted in the organic-based dispersant, in an equivalent fraction from 0 to 0.05 vol., with respect to the product volume in the organic phase. Also, this proportion can be used in the aqueous phase for some oils, without modifying the active chemical compound.

The composition can contain a chemical compound based upon an ionic liquid or an ionic liquid modified by means of a polymerization reaction with an oxirane. The product is dispersed in water-based or organic-based dispersant, according to the character of the crude oil and dynamic pumping conditions, preferably under conditions of turbulence, with a Reynolds number greater than 100, and with shear rates of between 0 and 20 Hz. The aqueous dispersant containing an ionic liquid or oxirane derivative is applied at a temperature between 10 and 90° C., at pressures between 1 and 350 atm, with pH between 4 and 12.5. The exact values depend on the characteristics of the crude oil to be treated, i.e., $9 \le pH \le 12.5$ for C1 type crudes, whereas for C2 type crudes one prefers $6 \le pH \le 8$, with a dosage between 3.75 l/h and 3,000 l/h, depending on the volume of crude to be treated.

The modified ionic liquid, which is diluted in an organic dispersant agent, has a characteristic oxirane polymer type chain, preferably with a string of 2 to 20 groups, which are mainly of methylene and ethylene type, and which are apparent in between 1 and 4 ppm of the $^1H$ NMR spectra.

The composition is obtained by mixing and dispersing a chemical compound with both thermal and structural stability, and with or without functional groups like alkoxides, i.e., methoxy-ethoxy-, -epoxy-, etc., either in aqueous or organic media, according to the best environmentally safe practices. The organic dispersing medium can be aromatic compounds, either alone or mixed, with or without alkyl groups integrated therein, or mixtures of aromatic compounds with some paraffins and olefins, preferably with a higher proportion of aromatics. Particular mixtures are aromatics and non-aromatics, such as xylene, perchloroethylene or toluene, in a volumetric ratio 0.425/0.425/0.142, or alternatively two of them in a volumetric ratio 0.7/0.2, with one being in a proportion from 0.95 to 0.87, with respect to the composition. Another option includes the dispersant composition Xy:0.37, Tol:0.16, PE:0.37, AS(surfactant): 0.02-0.05, where two of the aromatic compounds have the general formula $C_nH_{2n-6}$, and $C_8H_{10}$, and/or their mixtures, which are used as dispersing agents for Ionic complexes and its variants obtained by polymerization with oxirane, which is added in low proportion, between 0.5 to 5%, with respect to the total mixture of such chemical composition.

The chemical composition in an aqueous dispersant agent can be prepared thoroughly by means of a chemical mixture based on an ionic liquid or a modified ionic liquid and a dispersant agent, and with or without the use of a surfactant agent. The composition is produced in aqueous phase at temperatures preferably between 15 and 35° C. at atmospheric pressure, and a pH in the range $7 \le pH \le 12.5$. The fraction of the chemical compound of the composition is within the range $5 \times 10^{-4} \le C \le 1 \times 10^{-3}$, more specifically $2 \times 10^{-4} \le C \le 1.2 \times 10^{-3}$, or in the interval $2 \times 10^{-4} \le C \le 5 \times 10^{-4}$, with respect to the volume of crude oil to be treated.

The composition having an organic media as a dispersant is preferably prepared through a mixture using a container tank or a reservoir, where the chemicals in such organic media are poured in, at temperatures between 15 and 35° C., at atmospheric pressure and pH in the range $6 \le pH \le 8$, depending on the character of oil to be treated. The fraction of concentration is in the range $2\times10^{-4} \leq C \leq 1.2\times10^{-3}$, more preferably in the range $5\times10^{-4} \leq C \leq 1\times10^{-3}$, or more specifically in the range $2\times10^{-4} \leq C \leq 5\times10^{-4}$ with respect to the volume of crude oil to be treated.

The composition based on modified ionic liquids is obtained by a process of polymerization of with alkoxy-, methoxy-, ethoxy-, -epoxy type groups, to obtain functionalized ionic liquids, with general formula $C_nH_{2n-m}ClN_2O_2(C_3H_6O)_{2x}$, where $5 \leq n \leq 10$, $1 \leq m \leq 6$. In the formula, the anion can be $Cl^-$ or $OH^-$ and the cation is an imidazolium.

The chemical of the composition can have the general formula $[C_nH_{2n-1}ClN_2]_x[H_2O]$ and where $8 \leq n \leq 12$; with coefficients x,y calculated according to the volume of the crude oil (z) to be treated, within the following range: $x+y=0.05z$ to $x+y=0.66z$, with respect to the volume of crude oil where it is applied. The ratio x/y can vary preferably in the range from $2\times10^{-4}$ to $1\times10^{-3}$.

The presence of non-associated water in the crude oil can be 20% or more, and the relationship x+y varies from 0.2 to 0.45, while x/y remains the same or with a tolerance of $\pm 0.5\times10^{-4}$.

The composition can be mixed with the crude oil with the volumetric relationships between its components by injecting through a special pipe with a pumping system, specifically as follows: (1) downhole through capillary tubing, (2) using capillary tubing or through the annular area or through the production tube, (3) in the surface discharge lines of heavy oil-producing wells, (4) in crude oil transportation pipelines.

The composition can be based on ionic liquid, which has functional groups of the alkoxy type, i.e., methoxy-ethoxy- or -epoxy, which is combined with a dispersant agent, either aqueous or organic, in a proportion between 0 to 5% vol with respect to the volume of the dispersing agent, which in turn is composed of xylene, toluene, perchloroethylene, and a surfactant of the family of compounds based on alkyl-alkylamine sulphonate.

The compositions of the invention can be selected from:
a. A compound with general formula $[C_nH_{2n-m}ClN_2O_2]_x[H_2O]$ where $10 \leq n \leq 14$, $2 \leq m \leq 6$, where the value of n is obtained from the properties of crude oil to be treated. For certain types of crude oils, i.e., type C1 and C2, preferably n=10, m=2. The compound can be polymerized with oxirane, whose general formula is $C_nH_{2n-m}ClN_2O_2Cl(C_3H_6O)_{2x}$, which is dispersed in the aqueous or organic dispersing media, to reduce the viscosity of the heavy crude oils, for example, those of C2 and C5 type;
b. A compound with the general formula $C_nH_mN_pO_2$, where $8 \leq n \leq 10$, m=n+4 and $2 \leq p \leq 8$, preferably $9 \leq n \leq 12$, m=n+4 and $4 \leq p \leq 6$, and its corresponding modification $C_nH_mN_pO_2(C_3H_6O)_{2x}$, which is dispersed in aqueous or organic media for reducing the viscosity of heavy crude oils of type K, C or C1, C2, in a concentration that is preferably determined by the relations $[C_nH_m N_pO_2(C_3H_6O)_{2x}]_x[H_2O]$, with $9 \leq n \leq 12$, $13 \leq m \leq 16$, preferring values of n=9, m=n+4, p=5;
c. A compound with the general formula $C_nH_mN_2O_p$ where $10 \leq n \leq 25$, m=n+19 and $0 \leq p \leq 8$, preferably $18 \leq n \leq 22$, m=n+19 and $1 \leq p \leq 4$ and its modified derivative $C_nH_mN_2O_p(C_3H_6O)_{2x}$, which is dispersed and integrated together with a surfactant in aqueous or organic phase, for reduction of the viscosity of heavy crude oils, i.e., type C1 and C2, in a concentration preferably determined by the relations $[C_nH_mN_2O_p(C_3H_6O)_{2x}]_x[H_2O]_y$, with $20 \leq n \leq 22$, $40 \leq m \leq 42$;
d. A compound with the general formula $C_nH_mN_2O_p$ where $5 \leq n \leq 12$, m=2n-2 and $0 \leq p \leq 5$, preferably $8 \leq n \leq 10$, m=2n-2 and $3 \leq p \leq 5$, and derivatives of the general formula $C_nH_mN_2O_p(C_3H_6O)_{2x}$, which is dispersed in aqueous or organic media, with the use of surfactants for reducing viscosity of heavy crude oils, for example, and without limiting it, of type C2 and C5, in a concentration preferably determined by relations $[C_nH_mN_2O_p(C_3H_6O)_{2x}]_x[H_2O]_y$, $8 \leq n \leq 10$, $14 \leq m \leq 18$, where one prefers n=9, m=2n-2, p=m-12 or p=n-5 for C2 and C5 type crudes.

One embodiment of the composition is obtained by
(a) preparation of a chemical composition which consists of an ionic liquid that is obtained by a process of organic synthesis, such as alkylation or direct condensation. One example of a method of producing the imidazolium cations is disclosed in U.S. Pat. No. 5,077,414 to Arduengo, III, which is hereby incorporated by reference in its entirety.
(b) A polymerization reaction of the chemical composition as obtained in step (a) with oxirane, to obtain a polymer that includes the ionic liquid and additional groups that result from replacing with oxirane units, whose number is variable, between 2 and 20 units, and which have an asymmetrical or symmetrical morphology.
(c) mixing the chemical composition that is obtained in step (b) with a dispersing agent, either in aqueous or organic media. The water media, depending on the type of application, can occupy a volume between 5 and 50%, with respect to the volume of the crude oil to be treated, preferably between 5 and 20% vol, while the modified ionic liquid is between 0.3 to 5% vol of the total with respect to the composition, under controlled conditions of acidity/basicity, in the interval $4 \leq pH \leq 12.5$. Alternatively, the chemical compound is dispersed in organic medium, which is usually composed of three generic solvents such as xylene, perchloroethylene and toluene, in variable proportions, or either two of them or just one can be chosen, together with a surfactant, which allows integration of the mixture. In one embodiment, the surfactant contains a string with 12-16 carbons, and a sulphonic group together with a cation based on alkylamine.

The present invention relates to the application and use of a chemical composition to modify the physical properties (viscosity and interfacial tension) of heavy and extra-heavy crude oils, to increase their mobility. The chemical composition consists of the combination of systems based on ionic liquids or non-ionic liquids, depending on the character of the crude oil to be treated, or its original modification by polymerization reaction of such liquid with oxirane. These chemical compounds can be dispersed in the aqueous or organic media. The compound dispersed in the aqueous phase is used at temperatures between 5 and 90° C., with pressures from 1 up to about 340.23 atm (i.e., 5,000 psi), and under acid-base or within the pH range of 4 to 12.5. In one embodiment, a basic scheme for certain crude oil is used, i.e., a pH between 7 and 12.5. However, some crude oils are better handled under neutral conditions or acidic conditions, for example, those with a pH between 4 and 7. The dispersant can be organic and consists of a composition of at least one solvent and up to three, together with a surfactant that can be based on amphiphile, i.e., sulphonic moiety with hydrocarbon chain, with 12 to 16 carbons and a cation based on alkylamine, in the proportions disclosed herein. The composition can be introduced to the crude at various stages during operation with heavy crude oils, from the stage of extraction from the well in the field, during the transport of crude oil in surface pipelines, or in the well discharge pipelines. The introduction into the crude oil can be using a mixing unit in addition to a pumping unit with enough pressure to inject the chemical composition, which provokes a substantial reduction of the original fluid viscosity, thus improving the operation during the stages of production, transportation and processing of the heavy and extra-heavy crudes.

The chemical composition comprises or consists of a combination of systems based on ionic and non-ionic liquids, which may be pure or modified, mixed in dispersing agent, either aqueous or organic, depending on the nature of the crude to be treated, together with a surfactant, where the composition is used in conditions of temperature between 5 and 100° C., at pressures from 1 atm (14.7 psi) up to about 680.2 atm (10,000 psi).

These and other features of the invention will become apparent from the following detailed description of the invention which discloses various embodiments of the invention.

BRIEF DESCRIPTION OF THE DRAWINGS

The following are the drawings that accompany the present invention to have a better understanding of it, without limiting their scope.

DETAILED DESCRIPTION OF THE INVENTION

Figure 1:
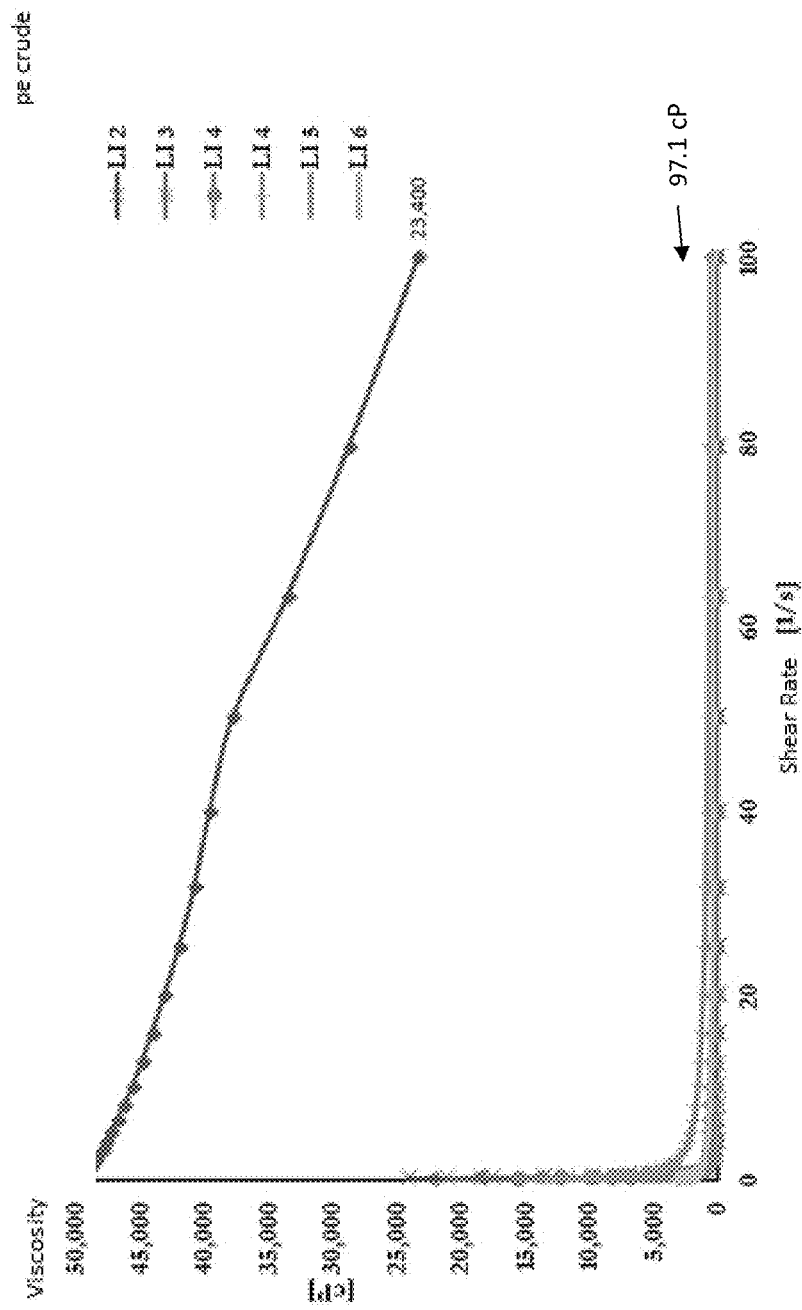
FIG. 1 illustrates the variation of viscosity (cP) obtained with products of this invention, formed by a chemical agent-based Ionic Liquid (AQ), and a water based dispersant (AD) agent, in conditions that are described herein, depending on the speed of cutting (Hz) to a raw type C (Table 2)

In contrast to conventional products, the chemical composition of the present invention may be dispersed either in aqueous or organic solution, for its use. The composition of the invention has properties that are different from other products used for similar purposes in the common practice, i.e., diesel, kerosene, biofuels, etc. The composition of the present invention comprises or consists essentially of an active compound, a dispersant and a surfactant.

The chemical composition of the present invention is based on ionic liquids and their variants, for example, those incorporating alkoxy-type functional groups, such as methoxy-, ethoxy-, -epoxy-, etc. The products form both symmetric and asymmetric units with variable chain length. The composition also may have diverse combinations with other similar chains or alternate species, i.e., those constituted by "amino"-type groups, thus forming basic amino acids and non-ionic surfactants. Some of the molecules are non-ionic species with significant polarity and a moderate hydrophilic-lipophilic balance (HLB), in such a way that they can disperse in water or organic solvents or they can be combined with other chemical compounds for improving its action. The main effects on properties of heavy crude oils may be promoted under certain physical or chemical conditions; i.e., temperature, pH, concentration range, addition order, water quality, mechanical agitation, mixing degree and contact time. The application of the chemical composition is capable of improving mobility and fluidity of most of known heavy oils, which tends to improve the pumping operations along the production lines. The composition and products are usually preferred to be applied by injection of the corresponding aqueous or organic solution mixed with other additives, according to the characteristics of the crude oil to be treated. The chemical agents are usually injected at various points along the production chain, for example at the site down-hole, along the production line, at the surface pipelines, or even in the storage tanks of the batteries. In all these cases the net effect is the mobility improvement of the heavy oil. Thus, a direct benefit is a better flow handling along the entire production chain. These effects may be exacerbated by some mechanical conditions that are susceptible to potentiate the first action of the composition and agents, for example, mechanical agitation, recirculation, static or dynamic mixing, progressive cavity pumping or by hydraulic injection, etc., which emphasize the effects of the composition of the present invention.

Specifically, the present invention refers to the use of certain chemical compounds and composition for effecting a substantial viscosity reduction in crude oil. The chemical compounds, composition and agents may be used alone, or in a more preferred use, the chemical compounds, composition and agents are accompanied by other additives to potentiate the action of the compounds, composition and agents. To provide surfactant effects, these agents may be dispersed in either aqueous or organic solutions, and one of the components can be modified by inserting functional groups, i.e., methoxy-, ethoxy, etc. Other functional groups may be inserted in the main polymeric chains, like amino groups, hydroxyl groups, etc. either alone or in combination with other species. The effects may be promoted under certain conditions of pH, concentration, pressure, temperature, time of contact, quality of water, water/oil ratio, iconicity, and mechanical conditions. The viscosity and interfacial tension of the original heavy crude oils may be improved by factors between $2 \times 10^2$ and $1 \times 10^3$ times, with respect to the viscosity of the original crude oil, at room temperature (25° C.).

More specifically, the present invention refers to the use of a combination of chemicals to conform a composition that may be water-based or organic agents and their combination, with properties for reducing the high viscosity and high interfacial tension that are characteristic of heavy and extra-heavy crude oils, i.e., heavy crude oils with densities between 8 and 22° API and those classified as extra-heavy crude oils, which have densities between 5 and 12° API.

The method of the invention includes the use of ionic and non-ionic molecules, either pure or functionalized with diverse groups, which are preferably dispersed, either in water or organic solvents. The composition of the invention is mixed with the crude oil at temperatures between 5 and 90° C., and pressures from 1 atm. to about 340 atm (5,000 psi). The composition can be acid and basic conditions, within a pH range of 4 to 12.5, though an alkaline regime is preferred for certain crudes. The composition can be combined with the crude oil in different stages along the production chain, from the stage of extraction, through the well production line, and during the surface transport of the crude oil by pipelines, or even in the stage of discharge of producing wells. The composition is usually injected under pressure, in order to obtain a substantial reduction of viscosity, which in turn improves the whole operation during the stages of production, transportation and processing of the heavy and extra-heavy crude oils.

The composition is in the form of aqueous or organic dispersions depending on technical limitations of the specific application, i.e., infrastructure constrains or specific characteristics of the fluids (such as a high ratio water/oil ratio W/O, a high gas/oil ratio G/O or local facilities to handle large volumes of water, etc. Usually the more exploited fields have a high water content, up to about 60% with respect to oil. Thus, in this case, the chemical composition dispersed in organic solvent is the best option, as this formulation reduces the total volume of the resulting mixture.

In one preferred embodiment, the composition contains at least one ionic liquid as the active compound, for example one with the general formula $[CnH_{2n-1}ClN_2]_x$ $[H_2O]_y$, though this does not represent any exclusive use as above-mentioned, this is an example where the indexes x and y are calculated on the basis of the volume of crude oil (z), within the following range between (1) x+y=0.25 z and (2) x+y=0.66 z based on the volume of crude oil. In one example where z=1, the ratio x/y can vary preferably in the range from $2\times10^{-4}$ to $1\times10^{-3}$. If the proportion of not congenital water in crude is important during a process of enhanced oil recovery, i.e., W/O>0.2, then the relation x+y can vary from 0.2 to 0.45, while x/y remains within a tolerance of $\pm 0.5\times10^{-4}$.

In one embodiment of the invention, the composition includes a compound of formula $C_nH_{2n-1}ClN_2$, a dispersant and a surfactant. The active compound of the formula $C_nH_{2n-1}ClN_2$ is an ionic liquid where the cation is an imidazolium cation and the anion is a chloride anion ($Cl^-$). One or more of the nitrogen atoms independently can have a linear or branched alkyl. In the formula, n is 5-14 and m is 1-6. In one embodiment, n is 5-10 and m is 1-6. In another embodiment, n is 10-14 and m is 2-6. In one embodiment, the cation is an imidazolium cation having the formula $[C_nH_{2n-1}N_2]^+$. Examples of imidazolium cations are disclosed in commonly owned U.S. application Ser. No. 14/338,712, filed Jul. 23, 2014, and Ser. No. 12/548,917, filed Aug. 27, 2009, which are hereby incorporated by reference in their entirety.

In another embodiment of the invention, the composition includes an active compound, a dispersant and a surfactant where the active compound is an ionic liquid having the formula $C_nH_mN_2O_p$, where n is 5-12, m is 2n-2 and p is 0-5. In one embodiment, the active compound is an ionic liquid where the cation is a heterocyclic ring, $[C_nH_{2n-1}N_2]^+$ and the anion is a chloride ion ($Cl^-$) or hydroxyl ion ($^-OH$). Preferably, the nitrogen atoms of the formula are part of the heterocyclic ring. Each nitrogen atom can be independently substituted with an alkyl. In one embodiment, each nitrogen atom is substituted with a $C_1$-$C_9$ alkyl.

An embodiment of the invention is directed to a method of reducing the viscosity of heavy and extra heavy crude oil by the addition of a composition including an active compound, a dispersing agent and a surfactant. The active compound is an ionic liquid of an imidazolium cation having the formula $[C_nH_{2n-1}N_2]^+$ and a chloride or hydroxyl anion where each nitrogen atom of the imidazolium cation includes an alkyl chain. In one embodiment, the alkyl chains have 1-8 carbon atoms. The imidazolium cation can be modified by reacting with an oxirane to produce an alkylene oxide substituted imidazolium. In one embodiment, the substituted imidazolium has the formula $[C_nH_{2n-1}N_2(PO)]^+$ $Cl^-$ where PO is propylene oxide. In one embodiment of the invention, the compound has the formula

where $A^-$ is $Cl^-$ or $^-OH$ and x is an integer of 1-10, and typically 1-8. In one embodiment, x is 1 or 2 defining a methoxy or ethoxy substituted imidazolium cation.

The ionic liquid can also be an alkylene oxide modified ionic liquid. Examples of modified ionic liquids have the formula

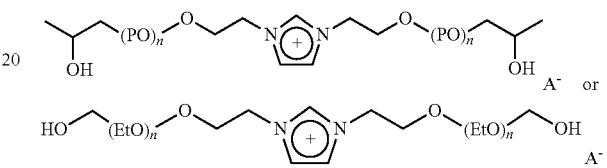

where PO is propylene oxide, EtO is ethylene oxide and n is the number of ethylene oxide or propylene oxide units and is 2-20, and $A^-$ is as defined above. One example of a propylene oxide modified ionic liquid has the formula

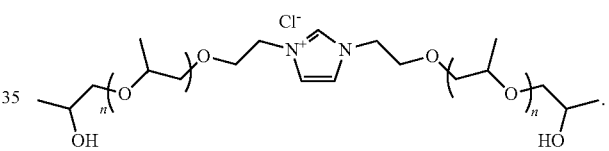

In the embodiment where the dispersant agent is aqueous, the preferred mode of application is by means of a tank having the appropriate volume and adaptability for installation and operation at the site of application, This tank contains the chemical composition and agents in aqueous phase, at temperatures between 15 and 35° C. The composition is poured at atmospheric pressure, with typical pH values in the range between 9 and 12.5 for certain crudes. However, this parameter is variable according to the crude oil character, i.e., for some cases the pH is preferably kept at around pH 7.0, or even less, while the fraction of one concentration of the chemical composition or agent is usually in the range of $2\times10^{-4}$ to $1.2\times10^{-3}$. According to the complexity and the nature of the crude oil to be treated, together with other economic factors, this parameter can be calculated for its application in the interval $5\times10^{-4} \leq 1\times10^{-3}$, with respect to the volume of crude oil to treat. A previous calculation must be performed according to the volume of application and, simultaneously, it must include the volume derived from its combination with water, which is usually made with a low power pump (0.5-10 HP). In the case of organic dispersant agents, the preferred mode involves the use of a tank with the appropriate dimensions and facilities in accordance with the volume needed at the site of application. In this case, the chemical composition comprises a phase dispersed in an organic solvent or mixtures thereof, preferably but not exclusively at temperatures between 15 and 35° C., at atmospheric pressure, with pH in the range between 4 and 8, depending on the nature of the oil to be treated. This parameter may be kept at a pH around 7.0 or less, while the preferred concentration of the chemical agent is usually kept within the range 200 ppm to 1,200 ppm, but according to the complexity and the nature of the crude oil to be treated, and by other economic factors, the best application fall in the interval between $2\times10^{-4}$ and $5\times10^{-4}$, with respect to the volume of crude oil to be treated. The injection can be performed by use of a pumping system, which may consist of a low power pumping system (0.5-10 HP).

According to the above, the invention is directed to the use, procedures of preparation, content and preparation of the combinations as described above, with some formulations, conditions, preparation and formulation ranges as described hereafter:

The product with the formula $[CnH_{2n-m}ClN_2O_2]x\ [H_2O]$ and for $5\leq n\leq 10$, $1\leq m\leq 6$, where the value of n is obtained from the behavior of the crude oil to be treated, for example, for certain types of crude oils, the type C1 and C2 (Tables 1-3), the values n=7, m=1 are preferred. The same functionalized product may be prepared by insertion of a string type oxirane, which is also useful to produce the compound of general formula $[CnH_{2n-m}ClN_2O_2\ (C_3H_6O)_x]$ where x is 2-20 and n and m are as defined above These chemicals are dispersed in an aqueous or an organic medium, in conjunction with a surfactant in low proportion, to reduce the viscosity of heavy crude oils, i.e., type C1 to C5 (Tables 1-4), in the conditions specified in the Examples 1 to 4.

The compound in one embodiment has the general formula $C_nH_mN_pO_2$ where $8\leq n\leq 10$, $m=n+4$ and $2\leq p\leq 8$, preferably $9\leq n\leq 12$, $m=n+4$ and $4\leq p\leq 6$ and its derivatives $C_nH_mN_pO_2\ (C_3H_6O)_{2x}$. These compositions, once dispersed and prepared according to the invention, are effective in reducing the viscosity of heavy crude oils, i.e., those with type K and C or C1 and C2 type crudes, in a concentration preferably dictated by the relations $[C_nH_mN_pO_2(C_3H_6O)_{2x}$ for $9\leq n\leq 12$, $13\leq m\leq 16$, where the value of n is obtained from the behavior and properties of the crude oil to be treated, for example, for oils type C1 and C2 (shown in Tables 1-3, preferred n=9, m=n+4, p=5, as well as the conditions specified in the corresponding Examples.) In this case the relationship between the indexes x, and z are due to the same proportions as specified in item 1.a above. These chemicals are dispersed in aqueous or organic medium, according to the characteristics of the site and crude to treated, in order to reduce the viscosity of the heavy crude oils, i.e., those with type C2 and C5 (Tables 1-3), in the conditions specified in the FIGS. 1-4.

In another embodiment, the compound has general formula $C_nH_mN_2O_p$, where $10\leq n\leq 25$, $m=n+19$ and $0\leq p\leq 8$, preferably $18\leq n\leq 22$, $m=n+19$ and $1\leq p\leq 4$ and modified form $C_nH_mN_2O_p(C_3H_6O)_{2x}$. This product, once dispersed and prepared according to the invention, is effective for reducing the viscosity of crude oils, i.e., heavy crudes of type C1 and C2 (Tables 1-3), in a concentration preferably dictated by the relations $[C_nH_mN_2O_p(C_3H_6O)_{2x}]_x\ [H_2O]_y$, for $20\leq n\leq 22$, $40\leq m\leq 42$, where the value of n is obtained from the character of crude oil being treated, for example, for the oils of type C1 and C2, the preferred values are n=21, m=n+19, p=m-36, or p=n-17, in the conditions specified in the Example 1, for reducing viscosity of heavy crude oils up to about 43.6% for the crudes type C1 and 99.8% for the crudes type C2 (tables 1-3).

Figures 4, 5:
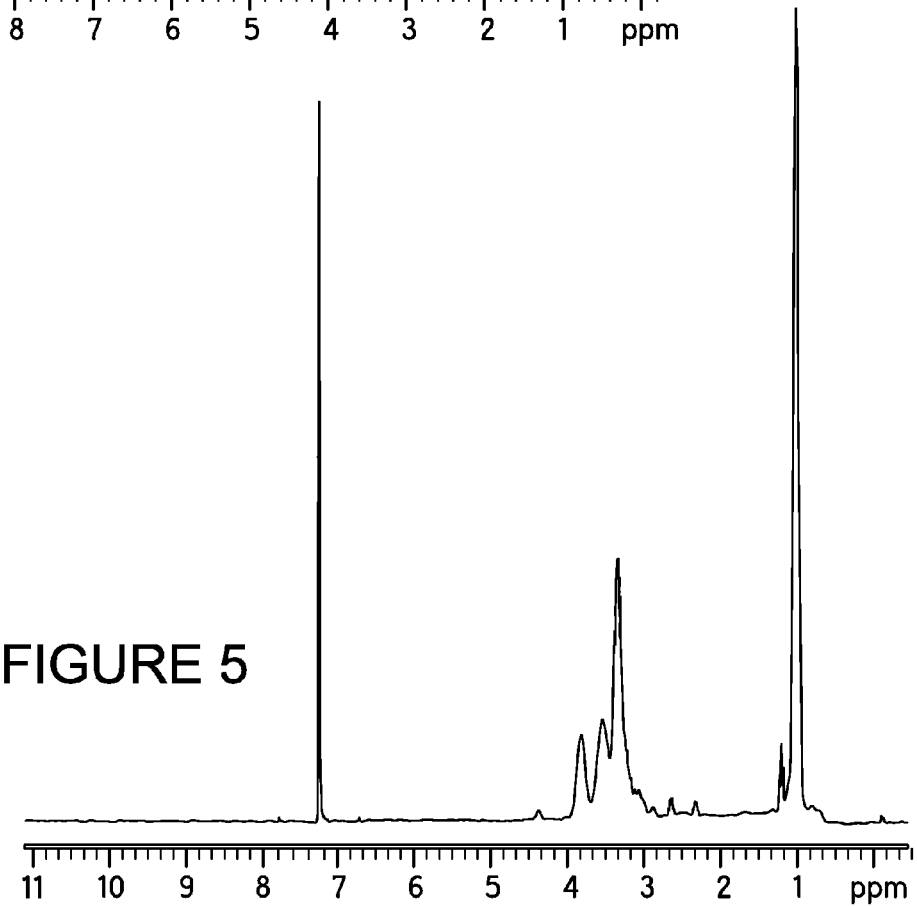
FIG. 4 shows the $^{13}$H NMR spectrum of a chemical agent, whose characteristics are similar to those described in the present application, showing the structure of carbon bonds.
FIG. 5 shows the $^{13}$H NMR spectrum of the same chemical agent shown in FIG. 4, after treatment, and verifies the chemical displacement corresponding to typical groups such as methyl, methylene, etc.

The procedure for the preparation of the abovementioned chemical compositions includes the following stages:
(a) Preparation of a chemical composition comprising or consisting of am ionic liquid with molecular structure and compositions as specified above, for example, as shown in FIG. 4, which uses the art commonly followed in chemical organic synthesis, such as alkylation, direct condensation, etc. This chemical composition is stable under the conditions of use and it is not corrosive by itself, or flammable and is easily transportable in the liquid phase.

(b) the previous chemical composition of step (a) is submitted to polymerization with an oxirane, in order to obtain a polymer from the previous basic unit, with more groups replaced by the oxirane type unit, with a variable number between 2 and 20 units. Generally, these chemical compounds are asymmetric polymers, but can also form complementary symmetric units, depending on the reaction conditions. The compounds thus obtained can be characterized using known techniques, such as $^1$HNMR, as illustrated in FIG. 5. The conformation of these polymers is considered a novelty in itself, as well as for the applications listed in this invention.

(c) The abovementioned basic chemical compositions (CC), which is the subject of this invention, is usually mixed with a dispersing agent (AD), which can have a 100% aqueous or 100% organic character. Water may be preferred depending on the type of application, for example in those cases where the water volume in the original crude oil is between 10 and 50%, or preferably between 10 and 20% vol, while the aforementioned chemical composition can take between 0.3 to 5% vol of the total volume (AD+AQ). In this case the combination is handled under controlled conditions of acidity/basicity, according to the rheological behavior of the crude oil to be treated. For example, in the pH between 4 and 12.5. In the second case, the chemical composition (CC) comprises a chemical agent that is dispersed in an organic medium, which preferably is composed by generic solvents like xylene, perchloroethylene and toluene, or xylene and toluene, or xylene alone, in varying proportions, according to the character of the crude oils to be treated, plus a surfactant agent (SA) that allows the full integration of the abovementioned components, which usually contains alkyl type chains with 2 to 14 carbon units and a sulfonic group with a cation based on iso-alkyl amine.

The main advantages of this application are summarized below:

1. An increase of productivity factor and profitability of producing wells, especially those containing heavy and extra-heavy oils, with results that depend on the abovementioned variables and of characteristics proper to the well. The chemical agents can be in aqueous or organic solutions. The formulations can be injected in one or several points, i.e., in the reservoir, production tube, well's discharge line and surface transportation pipelines. The net effect is the increase in the mobility of the crude oil, by reducing its viscosity and its interfacial tension, thus facilitating transportation and pumping operations. Therefore, the well productivity increases by increasing the flow rate, which follows the viscosity reduction. Therefore, this invention has a significant potential to promote a higher productivity of heavy oil wells, which is derived from a better oil mobility and its higher fluidity, which in turn improves the pumping operations and brings a cost reduction altogether.

2. A cost reduction in the surface pipeline transport of heavy crude oils, especially for long distance operations, due to viscosity reduction, less friction of the fluids and easier pumping operations along the transport chain, which reduces expenses associated with extra heating of the crude oil along the lines of transport, especially in winter time. The reduced viscosity also provide longer durability of the field installations, a decrease of the number of repairs arising from wear and use of pumping equipment, a reduction of delivery times, a risk reduction by deposit of asphaltenes, and additional savings in the use of other additives such as demulsifiers. Overall, the implementation of the present invention provides a multifactorial benefit derived from the decrease of crude oil mobility induced by the viscosity reduction as stated hereinbefore.

3. Greater flexibility and sustainability throughout the production chain, from extraction to processing, due to the use of chemical agents of low volatility in the aqueous medium, in contrast to high volatility conventional diluents such as kerosene, Diesel, naphtha, condensate, natural gas and light oils, which cause a negative environmental impact and are not always available around the production area, or tend to run short, depending on the field decline.

4. Flexibility in the "downstream" process steps or chain, i.e., in the processing stage, because of better mobility and fluidity of the crudes provide a better contact with a catalyst in the processing reactors. Additional improvements of the profitability of the heavy oil processing and along the production chain may be foreseen, with lesser operating costs derived from the increased oil mobility.

5. The injection of the abovementioned composition and agents into the reservoir might improve the rock wettability characteristics, thus facilitating the crude extraction. Also, through the addition of chemical agents of this invention, the rheological behavior of the heavy crudes tends to be Newtonian type, i.e. viscosity remains stable and independent of shear rate, which imparts much more stability during pumping operations and makes it production more predictable.

6. Additional benefits that are derived from application of the compositions related to formation of homogeneous water-oil emulsions, under dynamic conditions and the spontaneous emulsion breakage under static conditions. This behavior arises from the use of the composition of the invention and this contributes further to their potential application in several stages of production, transport and processing.

7. The versatility of the present invention can provide a valuable service at the production site or along downstream transport stages. The injection of these products in the form of aqueous solution, can be combined with steam or an organic dispersant, for adequate injection at the well bottom or at the well head, or even along the discharge line, with the benefits described herein.

8. The application of the products mentioned herein is performed by the use of similar facilities as those used in conventional enhanced oil recovery (EOR) operations.

The molecular structure of the chemical agents described herein was verified by means of 1H and 13C nuclear magnetic resonance (NMR), using a Gemini (Varian plus, 300 MHz), with reference of tetramethylsilane (TMS), using the solvent signals, i.e., $^1$H and $^{13}$C, as internal reference. Also, the GPC and MALDI-TOF techniques, as well as those based on infrared (FTIR) spectrometry, were applied, using a Perkin-Elmer 1600, FTIR 710-b spectrometer; the spectra in the region between 4000 and 650 cm$^{-1}$ were obtained mainly, in the ATR of Sapphire mode. These basic chemical compounds may be combined with other functional groups such as methoxy-, ethoxy-, epoxy- or similar groups, in order to emphasize its action. All of these chemicals or their combinations improve the flow of heavy crude oils and their preparation includes mixing them with dispersant agents in aqueous or organic-based solvents, with preferred proportions from 200 ppm to 3,000 ppm, with respect to the volume of the crude oil to be treated, preferably in conditions of temperatures and acidity that are compatible and practical for their injection at the site, which can be into the well, a storage tank or a well discharge line.

Another important aspect of this development is the potential influence of brine over the chemical agents, due to the combined action of water, salts, carbon dioxide and water vapor, which are commonly present or injected into wells for enhancing recovery. These additives can cause adverse chemical effects, including viscosity changes and variations of the interfacial tension. Both issues involve molecular interactions between chemical agents and heavy fractions of crude oils, which contribute to modify the physical properties and can affect recovery.

The impacts of the current development are technical, economic and environmental. These factors work in several ways. For example, one way is how the use of the present products can turn the heavy oil reserve volume into extractable oil reserve. Another conceptual change is the better capacity for pumping, as well as lower viscosities and higher mobility. These issues cause heavy oils to move faster and incur in lower energy costs, thus retaining its fluidity along the lines, without needing additional support like heating for improving their mobility.

One more aspect of the present invention is that oil-water emulsions are stable under a dynamic regime, but they break easily under static conditions. These properties ensure the recovery of crude oil after the conventional dehydration process, which gives the crude oil better dehydration conditions.

In summary, the addition of chemical agents as described hereinbefore provides both technical and economic advantages, as described further in detail in the following examples, which do not limit its scope:

Example 1

A chemical composition is prepared using common procedures as reported elsewhere, which consist mainly of condensation reactions, for obtaining a composition with a general formula $C_nH_{2n-1}ClN_2]_x$ $[H_2O]_y$ where $8 \leq n \leq 12$; the coefficients x, and y are calculated according to the volume of the crude oil (z) in the following range: (1) x+y=0.05 z and (2) x+y=0.66 z, with respect to the volume of crude oil, and where z=1, the ratio x/y vary preferably in the range between $2 \times 10^{-4}$ and $1 \times 10^{-3}$. Also, some variations of this composition are obtained by modification of the abovementioned formulation, for example by inserting an oxirane type polymer chain, as reported hereinafter, to obtain additional products with the general formula $C_nH_{2n-1}ClN_2(C_3H_6O)_{2x}$, where the value of n depends on the type of crude oil to treat. For example, in the case of a crude oil having the characteristics of C1 type crude oil (Tables 1 to 3) preferably n=11. If the water cut of the crude oil is high enough, e.g., more than 10% vol with respect to the original crude oil, then different relationships of x and y can be useful. For example, the value of x+y can range from 0.05 to 0.45, while the x/y ratio remains about the same, with a tolerance of $\pm 0.5 \times 10^{-4}$.

The characteristic data of the product thus obtained can be verified by IR spectroscopy. For example, in the case of the chemical precursor of this invention, the structural parameters are as follows: FTIR (cm$^{-1}$) 3600, 3500, 2850, 2785, 1690, 1480, 1078 cm$^{-1}$; also, $^1$H NMR (300 MHz, CDCl3) gives values of δ of 0.96 (t, 3H), 1.33 (m, 3H) 3.68 (m, 3H), 7.4 (d, 1H), 7.6 (d, 1H), 10.1 (s, 1H); $^{13}$C NMR (300 MHz) δ 13.8, 20.8, 32.2, 37.9, 58.2, 122.5, 123.0, 131.0; The HRMS calculation for $C_8H_{16}N_2O$ is equal to 216.30, while the value found is 216.14.

The chemical compositions described herein are preferably applied in aqueous solution when the water cut is less than or about 5% vol. Alternatively, if the water cut is higher than this figure, then an organic medium is preferred, i.e., the composition is dispersed in organic solvent or their mixtures, aromatics such as toluene, xylenes, di-methyl-formamide, etc.

According to one embodiment, the basic chemical composition is used as the precursor, which is subsequently combined with a dispersing agent, either in aqueous or organic media, plus a generic surfactant. The resulting composition effective for reducing the viscosity of the heavy and extra-heavy crude oils, as for example those classed as C1, C4 and C5 types, whose properties are explained further in the Tables Nos. 1 to 3. Other crude oils are also susceptible to interact with the products described herein, with the consequent benefit of a viscosity reduction, by controlling some parameters, such as the character of the dispersant agent and other parameters such as pH, salinity, etc. In addition, the chemical agents reported herein promote a more stable behavior for the heavy oils, i.e., a Newtonian like behavior, whose main characteristic is that the oil viscosity is independent of the shear rate.

The useful chemical agents described herein have the general formula $[C_nH_{2n-1}ClN_2]_x [H_2O]$, where $8 \leq n \leq 12$, and its modification has a composition given by $C_nH_{2n-1}ClN_2 (C_3H_6O)_{2x}$, where n, x and y are as defined above. These compounds promote a substantial modification of viscosity and surface tension of the heavy crude petroleum oils. The practical application of these products for viscosity reduction purposes requires a match between the crude oils to be treated and the chemical agent to be applied, i.e., for C1, C4 and C5 type oils it is better to apply certain formulations and conditions to produce the abovementioned effects. Some heavy crude oils from the Gulf of Mexico respond better to the treatment when $x+y=0.05$ z to 0.4 z, while $x/y=6 \times 10^{-4}$; under conditions of use, which include the temperatures and acidic-basic intervals recommended by the specific type of application. For example, in a typical case, C1 type crude oils show a substantial viscosity reduction when the chemical composition is applied within the temperature range between 10° C. and 35° C. Other variations work better under the reservoir temperature ranges, i.e., 70° C.-90° C., within the pressure ranges between 1 Kg/cm$^2$ and 200 Kg/cm$^2$, and a pH range of $10<pH<12.5$.

The chemical compositions of the present invention are preferentially applied in the liquid phase, i.e., water-base or organic-base formulation, together with a generic dispersant agent and surfactant, depending on the water cut and the infrastructure available in the field, mainly. Also, the action of these products may be enhanced by some dynamic pumping conditions, mixing under the action of static mixers or under a turbulent regime, etc. Thus, the viscosity profile will be near to pseudoplastic behavior, as shown in FIG. 1.

Figure 2:
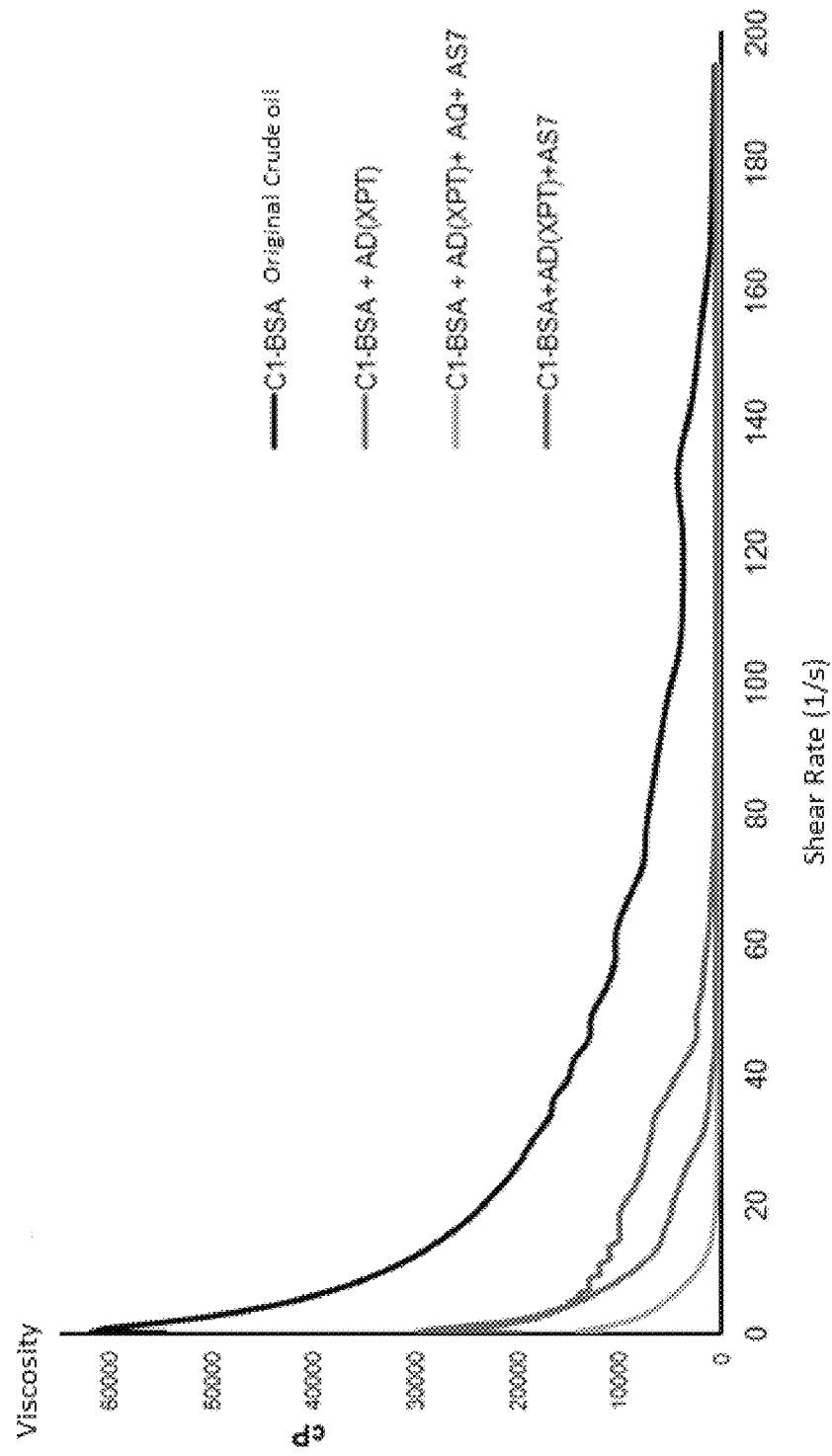
FIG. 2 shows the variation of viscosity with temperature for Crude type C (Table 2), without chemical agents.

The abovementioned chemical compositions may produce a significant reduction of viscosity, as high as 99%, with respect to the initial viscosity of the crude oil, at the laboratory scale. Typically, the viscosity of a heavy or extra-heavy crude oil in the interval $1 \times 10^4$ cP$<\mu<1 \times 10^5$ cP before treatment, can decrease to less than $2 \times 10^2$ cP, after the treatment with the compositions reported herein, under specific conditions, i.e. a factor of $10^2$ to $10^3$ times reduction of viscosity is attained at ambient conditions (25° C.). The results show consistency under dynamical conditions, after two, and three experimental replicas, with accuracy within the range±0.2%. Also, the measurements made with a Stabinger viscometer confirmed equivalent reduction of both kinematic and dynamic viscosity, depending on the temperature. FIG. 2 shows the variation of viscosity with shear rates in the presence of the chemical agents of this invention, which were formulated with an organic type dispersant agent, plus a generic surfactant, for treating heavy crudes of C1 type.

The use of the chemical agents described herein, whose concentration obey the relationships between x, y and z, produce important variations of viscosity, as high as 90 and 99.8%, with respect to the original heavy crudes, at room temperature. Typically, the use of these chemical agents in aqueous solution produce viscosity variations from 60,000 cP in the original heavy petroleum crude oils, down to about 2,018 cP and even less, i.e., down to about 200 cP, under dynamic conditions (0 to 10 Hz), thus achieving percent variations in the range between 97 and 99.7% at the laboratory scale.

Figure 3A:
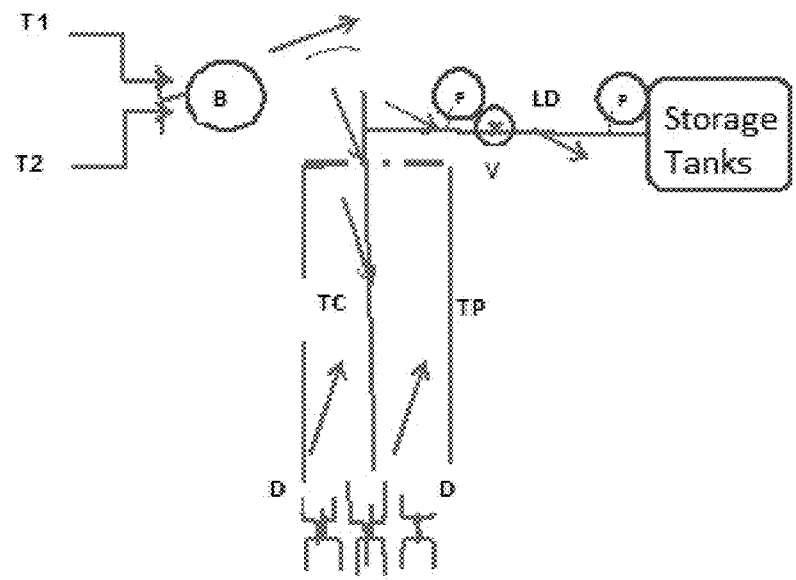
FIG. 3A shows the scheme for the application of the chemical composition to the bottom of the well.
Figure 3B:
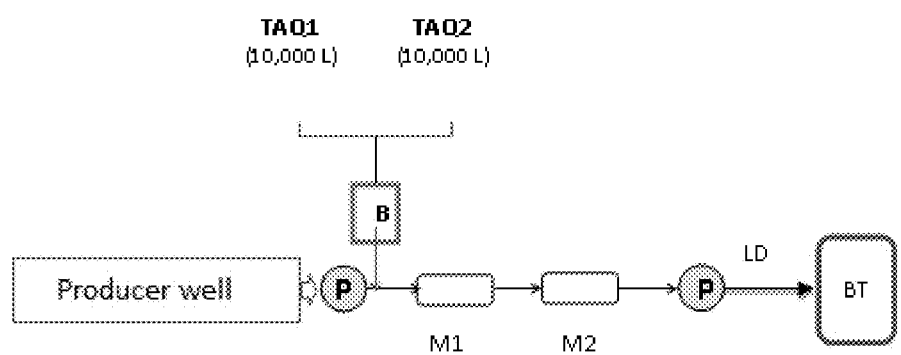
FIG. 3B shows the reaction scheme for introducing the composition in a surface transport line.

At the field scale applications this technology is performed by using the combination of basic or modified composition, with the use of the corresponding dispersant agent, either aqueous or organic, plus a surfactant. Such combination can be injected into the wellbore, according to the diagram shown in FIG. 3A, or it can be injected along the surface transport pipeline, or it can be injected into the battery reception tanks. The combination of the abovementioned chemical products with crude oils having the characteristics of C1, C4 and C5 crude oils, can be better prepared by mechanical agitation after mixing, e.g., using a low shear rate agitation of about 0.5 to 1.0 Hz, either within the tanks or along the pipelines, for example along the discharge lines, as shown in FIG. 3B.

If the application is intended to improve the viscosity of the heavy crudes along the production pipe, then the injection of the chemical composition can be performed from the wellhead using a ¼ inch diameter pipe, which is directed down to the well bottom (i.e. FIG. 3A); a centrifugal pump installed at the surface level can inject the liquid composition at pressures greater than well pressures, e.g., 1,200-2,000 psi. Alternatively, for a surface transport pipeline application, the chemical composition can be injected into the discharge line near to the wellhead, at the surface level, by means of a metering pump, which can be installed at some point along the transport lines (FIG. 3B).

The product injected downhole may use special piping and high pressure pumps, for example in the interval between 1,200 psi and 2,000 psi, in order to facilitate the flow within the production tubing. The net result of these operations is the viscosity drop, at least 50% and more, up to about 99%, with respect to the original crude oil, at the field scale, as explained hereinbefore. Overall, the potential economic impact of the present application is the reduction of costs, both in production and in surface transport, at least 25% and up to about 100%, with respect to the original costs, which depends on the type of crude oil, specific infrastructure in the field and conditions. The improved cost/benefit ratio arises from the viscosity drop due to the chemical agents application, as described herein, and under more preferred conditions the benefits improve, for example through the use of a better mixing into the zone of turbulence (Zone D in Scheme 1.A), the pH control of the chemical combination for a specific crude type, the use of mechanical devices at the well bottom for improving dispersion, etc., as specified herein.

Example 2

A chemical composition was prepared in accordance with the present invention, which has the general formula $C_nH_{2n-m}ClN_2O_2$, with $2 \le n \le 10$, $1 \le m \le 6$ through a condensation reaction, which is modified to obtain a composition with general formula $C_nH_{2n-m}ClN_2O_2$ $(C_3H_6O)_{2x}$, where preferably the value of n depends on the type of crude oil to be treated. For example, in the case of a C1 type crude oil (Tables 1-3) n=7 and m=1. This chemical composition is not used directly but it is dispersed in aqueous or organic means, then it is combined with a surfactant, which can be either natural or synthetic. Examples of suitable surfactants include alkyl-sulfonate of alkylamine, alkyl-sulfonate-of-poly-alkyl-amine, polyoxyethylene-alcohol, polyoxyethylene-alkyl-amine, polyoxyethylene-alkyl-amide and carboxy-methyl-cellulose sodium alkanol amides, alkanol amines, glycol-esters, polyglycerol esters, polyoxy-alkylene-polyol-ester, and ethylene-glycol monoester.

Once integrated as described herein, the abovementioned chemical composition is used to reduce viscosity of the heavy crude oils. The more useful precursor product for the abovementioned use has the general formula $C_nH_{2n-m}ClN_2O_2$, where $2 \le n \le 10$, $1 \le m \le 6$; this composition is verified after synthesis by IR spectroscopy (near), yielding the following data: 3500, 2850, 2785, 1725, 1690, 1480, 1150, 1078 cm$^{-1}$; $^1$H NMR (300 MHz, CDCl3) δ 0.96 (m, 3H), 1.33 (m, 6H), 2.20 (s, 3H), 3.63 (s, 3H), 7.4 (d, 1H), 7.6 (d, 1H), 10.1 (s, 1H); $^{13}$C NMR (300 MHz) δ 13.8, 20.8, 23.2, 32.2, 37.9, 58.2, 122.8, 123.0, 137.0, 172.8; the calculation HRMS product $C_nH_{2n-m}ClN_2O_2$ is 198.26, and the one found is 198.14, for n=7, m=1. From this basic product, the modified product $C_nH_{2n-m}ClN_2O_2$ $(C_3H_6O)_{2x}$ is prepared. The compound has the formula

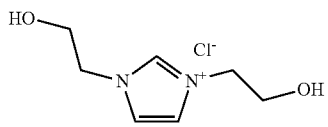

having the $^1$H NMR spectrum of FIG. 4.

The precursor or its modified form can be integrated into a dispersing agent, which can be aqueous or organic, plus a surfactant, for phase homogenization. Such product is useful for the reduction of viscosity of the heavy and extra-heavy crude oils, for example type K, C or C1 and C2. Preferably when the concentration is dictated by the relationship, $[C_nH_{2n-m}ClN_2O_2\ (C_3H_6O)_{2x}]_x\ [H_2O]$, where $5 \le n \le 10$, $1 \le m \le 6$, where the value of n is obtained from the behavior of crude oil to be treated. For example, for C1 and C2 type oils, n=7, m=1, preferably, as well as the conditions specified in the example No. 1. In this case, the relationship between x, and z is the proportion, as specified in Example 1. In these conditions, the products are integrated as mentioned above. Thus, the viscosity reduction the for C1 and C2 type crude oils is in the range from less than 1% for the C1 crude type, up to about 99.7% for the C2 type crude oil, with respect to its original viscosity. The $^1$H NMR spectrum of the propylene oxide imidazole is shown in FIG. 5 and has the formula

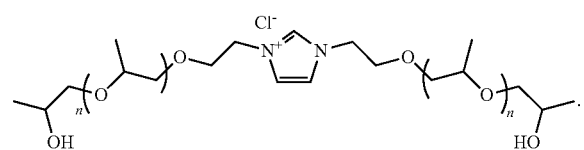

Similarly, the chemical agents can be injected directly into the pipelines used for surface transport of the heavy crudes. For example, for crude oils similar to C1, C2, C4 and C5. The aqueous based products are preferred when the water cut of the crude is low, while the organic based product is preferred when the water cut is superior to 5%, e.g., between 5 and 50% vol., in the range of temperatures between 10° C. and 80° C., and at the pH range specified in Example 1.

The abovementioned chemicals are better integrated mechanically into the tanks and pipelines that contain the crude for transport, respectively, during surface transport operations, which can be done by using a Triplex, reciprocating, or centrifugal type pumps. Also, the products described herein can be injected at the well bottom, in the form of aqueous or organic solution, through the use of a special pipe and high pressure pumps. For example, the composition can be injected at a pressure of 1,200 psi to 2000 psi, in order to facilitate its flow into the production pipe. In these conditions a significant viscosity reduction is obtained, i.e., between 50 and 99%, whose variations are explained in the preceding paragraphs as well as in Tables 5 to 12, with the consequent pressure fall along the production line, or equivalent to pressure falls in the range (ΔP) from $10^4$ psi upwards, e.g. up to about $10^5$ psi, up to values of ΔP between 100 and $10^3$ psi, depending on the conditions of the production line used in the surface transportation, such as length, diameter, etc., as well as of the magnitude of the viscosity change caused by the chemical compositions described hereinbefore. A typical result shows variations in the pressure and flow rates according to the viscosity drop, for example a 50% reduction in the viscosity leads to twice the flow rate.

Example 3

A chemical composition of the present invention is prepared according to the procedures established in the art of organic synthesis, with scaling factors for carrying out large-scale semi-industrial and industrial-scale synthesis, which can be based on the qualities and quantities described herein. According to this invention the proportions are based upon laboratory studies and reference data. For example, the chemical composition that is the subject of this invention is characterized by IR spectroscopic data as follows: IR (near) 3500, 2850, 2785, 2250, 1690, 1480, 1078 cm$^{-1}$; $^1$H NMR (300 MHz, CDCl3) δ 0.96 (m, 3H), 1.33 (m, 6H), 3.63 (s, 3H), 7.4 (d, 1H), 7.6 (d, 1H), 10.1 (s, 1H); $^{13}$C NMR (300 MHz) δ 13.8, 20.8, 32.2, 37.9, 58.2, 118, 122.8, 123.0, 137.0; the calculation HRMS for $C_nH_mN_pO_2$ is 205.25, while the finding is 205.84, where $8 \le n \le 10$, m=n+4 y $2 \le p \le 8$ and $9 \le n \le 12$, m=n+4 and $4 \le p \le 6$. This chemical composition is then modified by a polymerization reaction to obtain the chemical composition with general formula $C_nH_mN_pO_2$ $(C_3H_6O)_{2x}$. This composition is usually integrated into a dispersing agent as described hereinbefore, and combined with a surfactant agent, where such dispersing agent can be aqueous or organic type, to obtain a final composition for the uses described herein, i.e. for reducing the viscosity of heavy and extra-heavy crude oils of type K and C, C1 and C2, in a concentration preferably dictated by the relations $[C_nH_m-N_pO_2\ (C_3H_6O)_{2x}]_x\ [H_2O]_y$ for $9 \le n \le 12$, $13 \le m \le 16$, where the value of n is obtained from the rheological profiles and inherent properties of the crude oils. For example, for the oils of type C1 and C2, preferably n=9, m=n+4, p=5, as well as the conditions specified in the example No. 1. In this case the relationship between the indices x and z follow the proportions explained in Example 1. The rheological tests indicate that the abovementioned products have the ability to reduce the viscosity of the heavy crude oils with respect to the original viscosity, of about 20.8% for K type oils, while the viscosity reduction may attain up to about 99.8% for crude oils of type C. The product here developed can be applied in the form of aqueous or organic solutions, according to the abovementioned conditions, and this is suitable for applications either at the well bottom or along the transport pipelines, from the wellbore and along the surface transport pipelines, in the conditions described hereinbefore.

Example 4

The chemical composition of the present invention is prepared by following the common practices of organic synthesis and the products thus obtained are characterized by spectroscopic data, i.e., IR(near) 3500 2850, 2785, 1725, 1690, 1480, 1150, 1078 cm$^{-1}$; $^1$H NMR (300 MHz, CDCl3) δ 0.96 (m, 6H), 1.33 (m, 26H) 1.62 (m, 2H), 2.40 (t, 2H), 3.63 (s, 3H), 7.4 (d, 1H), 7.6 (d, 1H), 10.1 (s, 1H); $^{13}$C NMR (300 MHz) δ 13.8, 14.1, 20.8, 22.8, 25.8, 29.1, 29.4, 29.7, 31.9, 32.2, 37.5, 37.9, 58.2, 122.8, 123, 137, 177.5; the calculation of HRMS for $C_nH_mN_2O_p$ is 366.32, while the finding was 366.58, where $10 \le n \le 25$, m=n+19 y $0 \le p \le 8$, preferably $18 \le n \le 22$, m=n+19 y $1 \le p \le 4$. This chemical composition is integrated as described in the preceding examples, to obtain the useful form of the product of interest, which is effective for the reduction of viscosity of heavy crude oils of type C1 and C2, in a concentration preferably dictated by the relations $[C_nH_mN_2O_p]_x [H_2O]_y$ for $20 \le n \le 22$, $40 \le m \le 42$, where the value of n is obtained from the properties of the crude oil to be treated with such composition. For example, C1 and C2 oils n=21, m=n+19, p=m-36, or p=n-17, in the conditions specified in Example 1. The viscosity reduction of heavy crude oils can be up to about 43.6% and 99.8%, with respect to the initial viscosity of crude oils of type C1 and C2, respectively. In this case the indexes x and z obey the proportions specified in the previous examples. The products described herein can be applied either downhole and in the surface pipelines for the transport of heavy crudes, under conditions and benefits described in the previous examples. Similarly, the previous formula can be modified by polymerization with oxirane, leading to the chemical composition of general formula $C_nH_mN_2O_p(C_3H_6O)_{2x}$, where the value of n depends on the type of crude oil to treat. Such modification can be applied for the same purposes, preferably using an organic based dispersant agent.

Example 5

The chemical composition of the present invention presents spectroscopic characteristics IR (near) 3500, 2850, 2785, 1690, 1480, 1078 cm$^{-1}$; $^1$H NMR (300 MHz, CDCl3) δ 0.96 (m, 3H), 1.33 (m, 6H), 3.63 (s, 3H), 7.4 (d, 1H), 7.6 (d, 1H), 10.1 (s, 1H); $^{13}$C NMR (300 MHz) δ 13.8, 20.8, 32.2, 37.9, 58.2, 122.8, 123, 137; the HRMS calculation for $C_nH_mN_2O_p$ is 174.09, against an actual value of 174.67, where $5 \le n \le 12$, m=2n-2 y $0 \le p \le 5$, preferably $8 \le n \le 10$, m=2n-2 and $3 \le p \le 4$. This chemical composition is subject to a subsequent polymerization reaction, to obtain new products composed by an ionic liquid with polymeric chains of the oxirane type, with a general formula $C_nH_mN_2O_p(C_3H_6O)_{2x}$; These compositions are prepared in a more useful way by integrating it within a dispersing and surfactant agents, respectively, as explained in the preceding examples, to obtain a product that is effective for the viscosity reduction of heavy crude oils of C2 and C5 types. The concentration is preferably dictated by the relationships $[C_nH_mN_2O_p (C_3H_6O)_{2x}]x [H_2O]_y$ for $8 \le n \le 10$, $14 \le m \le 18$, where the value of n is obtained from the properties of the crude oil that is treated with such composition. For example, for oils of type C2 and C5, preferably n=9, m=2n-2, p=m-12 and p=n-5, under the conditions specified in the Example 1. In this case the relationship between the indexes x, and z are based the proportions specified in the Examples 1-4. The relationships between the coefficients n, m and p are not exclusive nor invalidate other relationships between n, m and p, which could be beneficial for the purpose of this invention. The results have shown that the liquid product that is the subject of the present invention has the ability to reduce the viscosity up to 28.1% and 99.8% for the abovementioned heavy crudes, with regard to their initial viscosity, respectively.

Example 6

In other conditions, different from the preceding examples, some chemical agents based upon a polymeric nature are used, whose molecular weight is between 50,000 and 100,000, which have a composition based on a series of amino acids with carboxylic and polar groups, simultaneously, along the main molecular chain. For example, 100 g of such polymeric agents may contain 78 to 80 mM of free carboxylic groups, thus forming a product that may be either diluted or suspended in the aqueous phase. The compounds can be better integrated to the heavy crude by simple mechanical agitation, within the range of temperatures between 10 and 80° C., in a concentration from 100 to 3000 ppm. Under these conditions, such chemical agents act on the properties of the heavy crude oils, with a substantial modification of its initial viscosity, when used in the abovementioned conditions of temperature and concentration, for example between 10 and 80° C., from P=1 Kg/cm$^2$ to P=250 Kg/cm$^2$, with pH 9 to 12.5, in a solution-based water dispersant with low salt content. Moreover soft water is preferably used in the application of the present invention, which may be valid for all the examples above. Thus, in the cases herein described, the chemical agents produce a stabilizing effect on the rheological behavior of the heavy crudes, as well as the improvement of the mobility of the same, under the pressure conditions described in this example, i.e., 1 Kg/cm$^2$ to 250 Kg/cm$^2$.

Therefore, the chemical composition with polymeric nature, can be either natural or synthetic, and can be used in combination with chemical compositions reported in the Examples 1 to 5 of this invention, with clear results about improving the rheological behavior of the crude oils and the net effect on the reduction of the viscosity of the heavy oils. The compositions mentioned herein work better under specific conditions, that can be injected into the heavy oil transportation pipelines. For example, in the pipelines transporting the crudes the C1 to C5 series, the polymeric products are preferred in aqueous base, in the range of temperatures between 10° C. and 100° C., while acidic conditions are specified by the pH range abovementioned. This means that the chemical agents with polymer base can be applied alone or in conjunction with the compositions described in the Examples 1 to 5, whose molecular weights are placed within the range described in this section and are susceptible to be mechanically integrated into oil containing tanks, or in surface transport pipelines. For example, the injection flow can be maintained by a metering pump, for example, those known as Triplex, reciprocating or centrifugal pumps, which can be installed somewhere along the lines of crude oil transportation, preferably at a location near to the wellhead, over the line of discharge or at the pumping units along the pipelines, for long distance transport operations. All these operations usually involve a change of control valves, for performing the opening and closing of the flow, the benefits being the substantial reduction of the pumping time, by a factor of at least 50% and more. With this, the useful life of the pumping units is increased by similar factors, because of the greater easiness of pumping, as derived from the viscosity reduction, a subsequent increase of production flow and a decrease of the pressure drop. Alternatively, the products described herein can be injected downhole, through the use of special piping and with the help of high pressure pumps, for example in the range of 1,200 psi at 2000 psi, in order to facilitate the flow in the production pipe. In this case an increase in the production flow of at least 26% can be obtained.

Example 7

The products described herein, as shown in Examples 1 to 6, are applicable in the form of a mixture, either in aqueous or organic dispersant agents, which can be injected into a producing well, or along the pipelines during surface transportation of the heavy oils. For this purpose, it is necessary to use high pressure pumping equipment (1,200-2500 psi) to overcome the effects of the back pressure of the well, or in the transportation pipelines. A representative scheme of the present invention is illustrated in the diagrams 3 (a) and 3 (b), which emphasize the injection process of chemical agents, which can be done directly along the mainline, preferably before the passage through static or dynamic mixers, preferably.

These devices are commonly used for achieving a homogeneous mixture of chemicals with heavy crude oils. The main effects achieved during the transport of the crudes are the improvement of productivity, through the shortening of delivery times, as well as a reduction of the cost of pumping operations, due to the viscosity improvement of the fluid.

The products described in Examples 1 to 5, in conjunction with polymeric agents described in Example 6, can be injected into the well bore, using several methods. For example, in a first method the chemical agents that were described previously can be injected through the pumping system using an aqueous mixture 1:1, of compounds described in Examples 1-3, along with a solution of sodium hydroxide (0.1 N), a mixture that is injected into the well discharge pipeline, in the way to the surface storage tanks. Also, a continuous flow of the chemical product can act along the pipeline, thus producing a net effect in the next pumping station, while keeping the first discharge pipeline still with some content of chemical agent. This mode of operation is very effective to reduce the viscosity of the heavy oil along the pipelines, by a factor of 100 to 1000 times, with the concentration of the product kept at the concentration mentioned in Example 1. Also, these effects occur along the transportation lines, until reaching the reception tanks for storage and beyond. The solution containing the chemical agents can be dispensed from a 5 to 10 $m^3$ storage tank, depending on production. It is recommended to install an injection tank in the first station of the pumping circuit, which may consist of a pump with enough capacity to suck the product from the storage tank and inject it into the discharge line. Alternatively, the product can be sent to the pumping station, then injected into the reception tank and from there it can be sent to the discharge line. This mode ensures an immediate reduction of the oil viscosity in the storage tank and beyond, along the pipelines.

Example 8

The present invention is directed to chemical compositions and their use by means of injection pumps along a pipeline or at the well bottom, by means of a metering pump, which can be attached to said pipeline directly, in order to produce effects such as viscosity reduction, which causes an increase of the well productivity, from 20% and up to about one order of magnitude above. Another benefit of this action is related to the easiness of use, because lighter crude oils are easier to handle, due to its lower viscosity, greater easiness of pumping and better fluidity. Another advantage of the abovementioned products is the lesser amount of energy needed to maintain the fluid pumping system. The chemical composition of the present invention is based upon ionic liquids that are usually added in a low concentration basis, from 200 to 3,000 ppm with respect to the crude oil to be treated, most preferably between 300 and 600 ppm at ambient temperature and high pressures (14.7 $Kg/cm^2$ up to 200 $Kg/cm^2$).

The interaction of these products with heavy oils results in improving its transportation along pipelines, i.e., mobility of the heavy oils increases and the benefits that are obtained are time reduction for delivery through transport pipelines. Also, lower energies are needed for pumping after the use of the products as mentioned hereinbefore, which is cause by the viscosity and pressure drop along the line. Such compositions can be injected directly into the pipelines for transporting heavy crudes, for example, those with characteristics similar to the series of crude oils C1 to C5. Such compositions can be water-based, and their temperature range of use is within the interval 10° C. to 80° C., with an acidity range (pH) between 7 and 12.5. The abovementioned chemical agents are susceptible to be mechanically integrated to storage tanks and pipelines for the transport of heavy crude oils, respectively. The applications of such chemical compositions are suitable for surface operations, for example, by means of a metering pump, i.e., Triplex, reciprocating or centrifugal type bombs, which are usually installed at some point along the pipelines, or at the valves where opening and closing of the flow is carried out. Alternatively, the products can be injected downhole by means of special pipelines and high pressure pumps, for example in the range of 1,200 psi at 2000 psi, preferably at the well temperature, and pH between 7 and 12.5, which conditions facilitate the flow along the production pipe.

Example 9

The chemical compositions of the present invention, as reported hereinbefore, can be applied into various forms. The preceding examples explain how these chemical agents can be injected downhole, using a dosing pump with enough pressure that can overcome the backpressure, e.g., 1,200 to 2800 psi. Such chemical agents can be diluted or suspended in water, then these products can be injected at the well bottom using a narrow tube of about 1.25 and 0.635 cm. This method of application ensures the entry of the chemical agents down to the bottom of the well, for provoking variations in the viscosity of the upcoming crude oil flow along the production line. The net effects are the increase of the well productivity, lowering production costs of at least 20% and up to 100% or more, depending on the reservoir and well characteristics. Intrinsic variables include permeability, underlying pressures and characteristics of the heavy oil, e.g. viscosity, water/oil ratio, total acid/basic number and physicochemical factors. The properties vary as a result of the physical effect caused by the chemical products, which results in lighter and easier crudes to handle, with a lower viscosity and easiness for pumping along the production line.

The chemical agents of this invention are used in a low concentration basis, preferentially with less than 1,000 ppm, i.e., between 200 and 1,000 ppm, at room temperature and pressures from about 1 kg/cm² up to about 300 Kg/cm². The water-based products are diluted in water and the final product is applied in a proportion between 20 and 60% with respect to crude oil, with pH values between 9 and 12.5. The interaction of chemicals with the oil alters the crude oil flow, in such a way that the mobility increases in the production line and, consequently, the cost of production decreases. In a typical example, a well having a production of 50 barrels per day can rise to a higher production to amount 62 to about 300 barrels per day, provided this well has the recovery factor accordingly, to release this volume, and making sure a good mixing at the well bottom; the net effect was an increase of the well productivity. A second category of application of the chemical agents referred hereinbefore, consists of injecting those products in adequate proportions and conditions along the well discharge line and along the transport pipelines, for reducing the fluid viscosity and thus improving the flow; in a typical example a reduction of viscosity occurs from 50% to about 90%, over the initial viscosity of the crude oil. The net benefit is the improvement of the flow, with a greater easiness for pumping, a lesser wearing rate and lesser stoppage frequency for repairs, and a subsequent higher profitability of the whole operation, i.e., lower energy costs, lesser time of delivery, operation smoothness, higher flows and lesser production costs. Also, the water-based products allow a total elimination of volatile hydrocarbon solvents (gasoline, condensates, kerosene, diesel, etc.), which are used currently in traditional practices; these solvents are not always available and represent additional costs. In summary, all the products developed in this invention are susceptible to apply through the first, second or both combined procedures and these procedures, in conjunction with the products described, which constitute the central part of this technology, as illustrated in FIG. 3.

TABLE 1

SARA Analysis (n-C₇) of heavy crude oils

| Family | Type C (% wt.) | Type D (% wt.) | Type K (% wt.) |
|---|---|---|---|
| Saturates | 20.83 | 20.11 | 24.36 |
| Aromatics | 34.46 | 32.88 | 42.62 |
| Resins | 29.32 | 29.89 | 7.51 |
| Asphaltenes | 15.39 | 17.17 | 24.36 |

TABLE 2

Chemical composition of heavy oils

| | Type C (% wt.) | Type D (% wt.) | Type K (% wt.) |
|---|---|---|---|
| Carbon | 84.16 | 83.73 | 84.19 |
| Hydrogen | 10.03 | 10.16 | 9.95 |
| Nitrogen | 0.49 | 0.55 | 0.61 |
| Oxygen | 0.16 | 0.19 | 0.1 |

TABLE 2-continued

Chemical composition of heavy oils

| | Type C (% wt.) | Type D (% wt.) | Type K (% wt.) |
|---|---|---|---|
| Sulfur | 5.16 | 5.37 | 5.15 |
| C/H₂ | 8.39/1 | 8.24/1 | 8.4/1 |

TABLE 3

Physical Properties (at 25° C.) of heavy crude oils

| | Type C (% wt.) | Type D (% wt.) | Type K (% wt.) |
|---|---|---|---|
| ° API | 12.9 | 10.85 | 12.5 |
| Density (g/cm³) | | | 0.9727 |
| Viscosity (cP) | 17,300 | 25,400 | 85,200 |
| Interfacial Tension(dyn/cm) | 28 | 35 | 40 |
| TAN mgKOH/g | 1.00 | 1.57 | 0.19 |
| TBN mgKOH/g | 3.28 | 3.33 | 4.65 |
| Water (% vol) | 8.98 | 0.96 | 0.12 |

What is claimed is:

1. A method for reducing the viscosity of heavy and extra-heavy crude oil, comprising the step of introducing a viscosity reducing composition into the heavy or extra heavy crude oil in an amount effective to reduce the viscosity of said crude oil, said composition comprising
   an ionic liquid active compound of the general formula $[CnH_{2n-m}ClN_2O_2]_x[H_2O]_y$ where $5 \leq n \leq 10$; $1 \leq m \leq 6$ with the coefficients x, y calculated according to the volume of crude oil (z) being treated, and where x and y range from $x+y=0.25z$ to $x+y=0.66z$, and where the ratio x/y is in the range between $2 \times 10^{-4}$ and $1 \times 10^{-3}$;
   an aqueous- or organic-based dispersing agent in an amount of up to 35% vol based on the volume of said composition and 60 to 97% based on the volume of said active compound; and
   a surfactant in an amount to form a homogeneous emulsion, where said surfactant is an alkyl sulfonate-alkylamine, having an alkyl chain of 8 to about 14 carbons, and a cation formed by an isopropyl chain.

2. The method of claim 1, wherein the dispersing agent comprises xylenes and methyl-benzene, the dispersing agent being integrated in variable proportions based on the type of crude oil to be treated in an amount of between 0.3 to 0.5 xylene, 0.1 to 0.5 methyl-benzene, and optionally 0.3 to 0.5 perchloroethylene, wherein the amounts are parts by volume with respect to the total volume of said dispersing agent; and where said surfactant is included in an amount between 0.01 to 0.025 parts by volume.

3. The method of claim 2, wherein said ionic liquid is a modified ionic liquid, which is diluted in said organic dispersing agent, in an equivalent fraction up to 0.05 vol., with respect to the volume of the dispersing agent.

4. The method of claim 1, wherein said ionic liquid is a modified ionic liquid obtained by a polymerization reaction of an ionic liquid with oxirane, and is dispersed in said aqueous-based or organic-based dispersing agent, according to the character of the crude oil and dynamic pumping conditions, under conditions of turbulence, with Reynolds number greater than 100, and with shear rates of between 0 and 20 Hz.

5. The method of claim 4, wherein the aqueous dispersing agent containing said ionic liquid or modified ionic liquid, is mixed with said crude oil at a temperature between 10 and 90° C., at pressures between 1 and 350 atm, with pH between 4 and 12.5, whose exact values depend on the characteristics of the crude oil to be treated with a dosage between 3.75 l/h and 3,000 l/h, depending on the volume of crude to be treated.

6. The method of claim 4, wherein the modified ionic liquid comprises 2 to 20 repeating groups of methylene or ethylene, and which are present in between 1 and 4 ppm of the 1H NMR spectra.

7. The method of claim 1, wherein said composition is obtained by mixing and dispersing said active compound having thermal and structural stability with optional functional groups selected from the group consisting of methoxy-ethoxy-, -epoxy-, in said aqueous or organic dispersing agent, where said dispersing agent comprises a mixture of xylene, perchloroethylene and toluene in a volumetric ratio 0.425/0.425/0.142, or a mixture of Xy:0.37, Tol:0.16, PE:0.37, AS(surfactant): 0.02-0.05, which is added in proportion between 0.5 to 5%, with respect to the total mixture of such chemical composition.

8. The method of claim 1, wherein the wherein said active compound is dispersed in said aqueous dispersing agent at temperatures between 15 and 35° C. at atmospheric pressure, and a pH in the range $7 \leq pH \leq 12.5$, in the range $5 \times 10^{-4} \leq C \leq 1 \times 10^{-3}$, with respect to the volume of crude oil to be treated.

9. The method of claim 1, wherein said composition is prepared through a mixture using a container tank or reservoir, and where the composition is added to said crude oil at temperatures between 15 and 35° C., at atmospheric pressure and pH in the range $6 \leq pH \leq 8$, at a concentration in the range $2 \times 10-4$ to $1.2 \times 10^{-3}$, with respect to the volume of crude oil to be treated.

10. The method of claim 1, wherein said ionic liquid is a modified ionic liquid prepared by a process of polymerization of an ionic liquid to obtain functionalized ionic liquids with alkoxy-, methoxy-, ethoxy-, -epoxy groups, with general formula $C_nH_{2n-m} ClN_2O_2(C_3H_6O)_{2x}$, where $5 \leq n \leq 10$, $1 \leq m \leq 6$.

11. A method of reducing the viscosity of heavy and extra-heavy crude oil, comprising the step of adding an viscosity reducing composition to said heavy or extra-heavy crude oil in an amount effective to reduce the viscosity, wherein said viscosity reducing composition comprises an ion liquid active compound, an aqueous or organic dispersing agent and an alkyl sulfonate-alkylamine surfactant having a $C_8$ to $C_{14}$ alkyl and a cation formed from an isopropyl chain, wherein the active compound is dispersed in said aqueous or organic dispersing agent, in a proportion that can vary according to the general formula $[C_nH_{2n-1}ClN_2]_x [H_2O]$ where $H_2O$ corresponds to water present in said crude oil, and where $8 \leq n \leq 12$; with coefficients x, y calculated according to the volume of the crude oil (z) to be treated, within the following range: x+y=0.05 z to x+y=0.66 z, with respect to the volume of crude oil and the ratio x/y can vary in the range from $2 \times 10^{-4}$ to $1 \times 10^{-3}$.

12. The method of claim 1, wherein the presence of non-associated water in the crude oil is 20% or more, and where the relationship x+y varies from 0.2 to 0.45, while x/y remains the same or with a tolerance of $\pm 0.5 \times 10$-4.

13. The method of claim 1, wherein volumetric relationships between said components are injected through a pipe with a pumping system selected from the group consisting of: (1) downhole through capillary tubing, (2) capillary tubing or through the annular area or through the production tube, (3) surface discharge lines of heavy oil-producing wells, and (4) crude oil transportation pipelines.

14. The method of claim 1, wherein said ionic liquid has functional groups selected from the group consisting of methoxy-, ethoxy and -epoxy, and is combined with said dispersing agent an amount of up to 5% vol with respect to the volume of said dispersing agent, and where said dispersing agent comprises xylene, toluene, perchloroethylene, and an alkyl-alkylamine sulphonate surfactant.

15. A method of reducing viscosity oft heavy and extra-heavy crude oil comprising introducing a viscosity reducing composition to the heavy or extra-heavy crude oil in an amount sufficient to reduce the viscosity, wherein said viscosity reducing compositions is selected from the group consisting of:
  a. an active compound comprising an ionic liquid having the general formula $[C_nH_{2n-m}ClN_2O_2]_x$ $[H_2O]$ and $10 \leq n \leq 14$, $\leq 2m \leq 6$, where the value of n is based on the properties of said crude oil to be treated; or an ionic liquid polymerized with oxirane and having the general formula is $CnH_{2n-m}ClN_2O_2Cl$ $(C_3H_6O)_{2x}$, dispersed in an aqueous or organic dispersing media, to reduce the viscosity of the heavy crude oils of C2 and C5 type;
  b. an active compound comprising an ionic liquid having the general formula $C_nH_mN_pO_2$, where $8 \leq n \leq 10$, m=n+4 and $2 \leq p \leq 8$, m=n+4 and $4 \leq p \leq 6$, or an ionic liquid obtained by polymerizing with an oxirane and having the formula $C_nH_mN_pO_2(C_3H_6O)_{2x}$, dispersed in aqueous or organic media for reducing the viscosity of heavy crude oils of type K, C or C1, C2, in a concentration determined by the relations $[C_nH_mN_pO_2 (C_3H_6O)_{2x}]_x [H_2O]_y$ with $9 \leq n \leq 12$, $13 \leq m \leq 16$;
  c. an active compound comprising an ionic liquid having the general formula $C_nH_mN_2O_p$ where $10 \leq n \leq 25$, m=n+19 and $0 \leq p \leq 8$, or an ionic liquid polymerized with an oxirane and having the formula $C_nH_mN_2O_p (C_3H_6O)_{2x}$, dispersed and integrated together with a surfactant in aqueous or organic dispersing agent, for reduction of the viscosity of heavy crude oils of type C1 and C2, in a concentration dictated by the relations $[C_nH_mN_2O_p (C_3H_6O)_{2x}]_x [H_2O]_y$ with $20 \leq n \leq 22$, $40 \leq m \leq 42$; and
  d. an active compound comprising an ionic liquid having the general formula $C_nH_mN_2O_p$ where $5 \leq n \leq 12$, m=2n−2 and $0 \leq p \leq 5$ or an ionic liquid polymerized with an oxirane and having the formula $C_nH_mN_2O_p(C_3H_6O)_{2x}$, dispersed in aqueous or organic media, and a surfactants for reducing viscosity of heavy crude oils of type C2 and C5, in a concentration determined by relations $[C_nH_mN_2O_p(C_3H_6O)_{2x}]_x$ $[H_2O]_y$ $8 \leq n \leq 10$, $14 \leq m \leq 18$.

16. A procedure for preparation of the chemical composition of claim 1, for reducing the viscosity of heavy and extra-heavy, crude oils, comprising the following stages:
  (a) preparation of an ionic liquid active compound obtained by a process of organic synthesis by alkylation or direct condensation;
  (b) a polymerization reaction of the ionic liquid obtained in subsection (a) with oxirane, to obtain a polymer that includes 2 to 20 oxirane units, which have an asymmetrical or symmetrical morphology; and
  (c) mixing the reaction product obtained from subparagraph (b), with an aqueous dispersing agent in a volume between 5 and 50%, with respect to the volume of the crude oil to be treated, ionic liquid is between 0.3 to 5% vol of the total with respect to the composition, under controlled conditions of acidity/basicity, at $4 \leq pH \leq 12.5$; or organic medium comprising a mixture of xylene, perchloroethylene and toluene, in variable proportions, and a surfactant comprising 12-16 carbons and a sulphonic group with an alkylamine cation.

17. The method of claim 1, wherein said active compound is an ionic liquid having an imidazolium cation and a chloride or hydroxyl anion.

18. The method of claim 1, wherein said active compound is an ionic liquid having the formula

where $A^-$ is $Cl^-$ or $^-OH$, and x is an integer of 1-10;

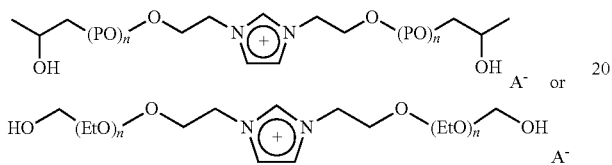

where PO is propylene oxide, EtO is ethylene oxide and n is the number of ethylene oxide or propylene oxide units and n is 2-20.

* * * * *